United States Patent [19]

Cline et al.

[11] Patent Number: 5,313,616

[45] Date of Patent: May 17, 1994

[54] METHOD FOR ANALYZING CALLS OF APPLICATION PROGRAM BY INSERTING MONITORING ROUTINES INTO THE EXECUTABLE VERSION AND REDIRECTING CALLS TO THE MONITORING ROUTINES

[75] Inventors: David C. Cline, San Jose; Andrew P. Silverman, Los Gatos; Farrell W. Wymore, Mountain View, all of Calif.

[73] Assignee: 88Open Consortium, Ltd., Sunnyvale, Calif.

[21] Appl. No.: 584,189

[22] Filed: Sep. 18, 1990

[51] Int. Cl.$^5$ .......................... G06F 11/30; G06F 9/45
[52] U.S. Cl. .................................. 395/500; 395/575; 395/700; 371/19; 364/274.5; 364/280.4; 364/280.5; 364/264.1; 364/DIG. 1
[58] Field of Search ............... 395/500, 575, 600, 700, 395/800; 371/19

[56] References Cited

U.S. PATENT DOCUMENTS

| | | | |
|---|---|---|---|
| 4,100,532 | 7/1978 | Farnbach | 382/1 |
| 4,533,997 | 8/1985 | Furgerson | 395/425 |
| 4,642,765 | 2/1987 | Cocke et al. | 395/700 |
| 4,692,897 | 9/1987 | Crabbe, Jr. | 371/25.1 |
| 4,951,195 | 8/1990 | Fogg, Jr. et al. | 395/500 |
| 5,047,919 | 9/1991 | Sterling et al. | 395/575 |
| 5,204,956 | 4/1993 | Danuser et al. | 395/575 |
| 5,210,862 | 5/1993 | De Angelis et al. | 395/575 |
| 5,212,794 | 5/1993 | Pettis et al. | 395/700 |

OTHER PUBLICATIONS

Joseph et al, "A Fault Tolerance Approach To Computer Viruses", IEEE, Apr. 1988, pp. 52-58.

Primary Examiner—Thomas C. Lee
Assistant Examiner—Paul Harrity
Attorney, Agent, or Firm—Fish & Richardson

[57] ABSTRACT

A method for verifying the conformance of an application program to a set of system rules characterized by the development of a conformance database, the performance of a static analysis of the application program to determine whether the application program is in static conformance with the conformance database and the performance of a dynamic analysis of the application program to determine whether the application program is in dynamic conformance with the conformance database. The static analysis produces a graph of the basic blocks of the application program and analyzes the graph for conformance to system rules, dead code and coverage metrics. The dynamic analysis adds a small amount of monitoring code into an executable application program which monitors the application program as it is exercised in a test harness. The monitoring code produces a log database which can be analyzed for run-time non-conformities of the application program.

11 Claims, 15 Drawing Sheets

METHOD FOR ANALYZING CALLS OF APPLICATION PROGRAM BY INSERTING MONITORING ROUTINES INTO THE EXECUTABLE VERSION AND REDIRECTING CALLS TO THE MONITORING ROUTINES

BACKGROUND OF THE INVENTION

This invention relates generally to computer software and more particularly to software designed to test application programs.

A digital computer system includes both hardware and software. The hardware includes the physical portions of the computer system such as the central processing unit (CPU), memory, input/output (I/O) ports and peripherals. The software portion of the system comprises a sequence of instructions stored in memory which direct and control the operation of the hardware.

The computer system's software includes both system and application software. The system software, often referred to as the "operating system", interacts directly with the hardware of the computer system to perform such functions as storing data to memory, inputting and outputting data and manipulating the registers of the CPU. Application software interfaces with system software and typically performs user-specific applications such as spreadsheet analysis, word processing and computer aided design (CAD).

A problem encountered by application software developers is that application software developed to work with a particular operating system will almost certainly not work with other operating systems, even if these alternative operating systems are closely related an operate on similar hardware platforms. Application software developers therefore tend to write application programs for the most common operating systems to maximize the potential size of their market. After application software has been developed for a particular operating system it may, with varying degrees of effort, be modified or "ported" to run on other operating systems.

Another problem encountered by software developers is that hardware from different vendors tends to be different in architecture even if they are using the same operating system. Since many application software developers bypass the operating system to increase system performance, their application software may not run on all hardware platforms which support the operating system. In these circumstances software developers have several choices: 1) they can choose not to bypass the operating system and accept lower performance of their application program; 2) bypass the operating system but only support the most common hardware platform; or 3) bypass the operating system and port the application program to support multiple hardware platforms.

There is a trend in the industry towards computer systems designed around open standards rather than proprietary standards. In proprietary standard systems the structure and operation of the computer system is owned and protected by a particular vendor with a combination of patents, trade secrets and copyrights. Proprietary system manufacturers tend not to license others to make systems which would compete with their own. Examples of proprietary systems include computer systems manufactured by Digital Equipment Corporation, Apple Computers, Inc. and Wang Laboratories. In open standard systems certain details concerning the structure and operation of the computer system are published and are typically made available free of charge or for a modest licensing fee. Examples of open standard systems include systems which use the MS-DOS operating system of Microsoft, Inc. or certain versions of the UNIX system from AT&T. In theory, application developers would rather produce application software for open standard systems than proprietary standard systems due to a potentially larger number of systems which could run their software. The advantage for hardware and operating system vendors in conforming their systems to open standards is that they will probably have a larger base of application software available to their customers and may therefore sell more of their hardware platforms and operating systems.

When a new computer architecture is developed it can be decided whether it should adhere to proprietary or open standards. For example, the relatively new reduced instruction set computer (RISC) processors available from such companies as Sun Microsystems, MIPS, AMD and Motorola can be designed into systems which operate under proprietary standards or can be designed into systems which operate under more open standards. The trend with RISC processors is to design them into systems which utilize some form of UNIX, making them compatible with other such systems at least at the UNIX source code level which is typically written in the language C. However, even computer systems having the same RISC processor and running under a version of UNIX are probably not compatible at the object module or binary code level due to incompatible uses of the processors registers, ports and memory interfaces. If a number of vendors wish to produce a truly open standard system, it is therefore necessary that they agree upon certain design and operating rules so that an application program which conforms to the same design and operating rules will run on all conforming systems.

A problem encountered with such an approach is how to ensure that an application program which is supposedly designed according to the standard rules will actually operate on systems provided by a number of manufacturers. For example, certain application programs written for the MS-DOS operating system will not work on some PC-clones because the hardware is not 100% compatible. As another example, some UNIX applications will work only with certain versions of the UNIX operating system. There is therefore a need in the software industry for procedures which can verify that application software developed in conformance with a set of accepted design rules will operate with computers and operating systems from any vendor which also adopts those design rules.

SUMMARY OF THE INVENTION

The present invention certifies that tested and verified application programs will run on any hardware and operating systems which were designed in conformance with a set of system rules. This invention therefore allows application program developers to produce software which conforms to open standards, thereby greatly increasing the potential market for their application programs.

A method for certifying the portability of software between computer systems begins with the development of a set of system rules. Hardware manufacturers, operating system developers and application program developers all produce products which comply with these system rules. Certification tests are then run to ensure that the application programs will run on any conforming computer system regardless of the vendor.

The certification tests include a static analysis and a dynamic analysis of the application program. First, a conformance database is developed which includes allowable external calls, such as system calls and procedure calls. Then a static analysis is performed which analyzes the object code of an application program to determine whether any illegal or erroneous external calls are being made. Finally, a dynamic analysis of the program is performed which analyzes the application program as it is being run to determine any runtime errors in the calls made by the application program. If no errors are detected in either the static analysis or the dynamic analysis then the application program is certified to be compatible with the set of system rules and is transportable without change between all certified compatible computer systems.

A preferred method for static analysis converts an object code version of the application program into a graph of basic blocks, inverts the graph and analyzes the inverted graph for errors and external calls which do not conform to the system rules. As an option, dead code analysis and basic block coverage can also be performed on the graph.

The dynamic analysis is accomplished by adding a small amount of monitoring code to the application program and verifying system and procedure calls and determining program coverage as the application program executes a test program. The monitoring code creates a log database which is used by a separate "post" program to print a report of call usage and program coverage after the completion of the application program run.

After the static analysis and the dynamic analysis indicates conformance to the predetermined set of system rules the application program can be certified to be statically and dynamically compatible with all certified computer systems. Furthermore, the application will be compatible with future hardware platforms and operating systems which are also designed in conformance with the set of system rules thereby achieving generational portability. The application program needs to be tested on only one certified computer system to attain compatibility certification for all current and future generations of certified computer systems.

An advantage of defining the portability standards in advance of hardware and software design is that hardware/software development work can progress concurrently. For example, a software application for a particular vendor's hardware system can be written and verified on other conforming systems before that vendor's hardware system is available.

These and other advantages of the present invention will become clear to those skilled in the art upon a study of the detailed description of the invention and of the several figures of the drawings.

DETAILED DESCRIPTION OF THE PREFERRED EMBODIMENTS

Figure 1:
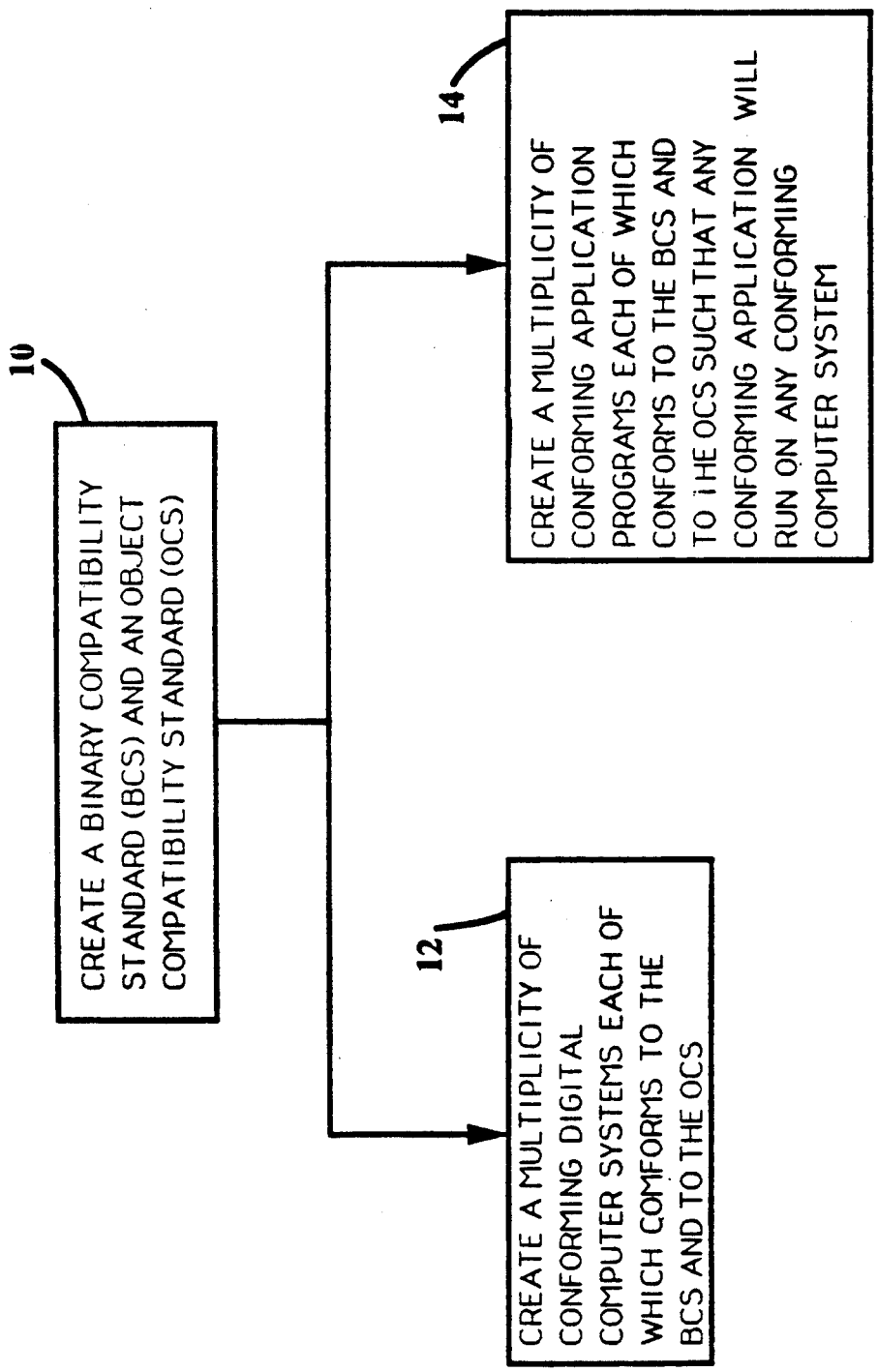
FIG. 1 is a flow diagram of a method for producing portable application programs which conform to a set of system rules.

In FIG. 1 a flow diagram illustrates a basic process for certifying the portability of software between computer systems. In a first step 10, as set of system compatibility rules including a binary compatibility standard (BCS) and an object compatibility standard (OCS) are developed. By "binary", "binary code", "binary level" or the like it is meant that the program is in the executable machine code language of a computer system's CPU. By "object", "object code", "object level", "object module" or the like it is meant the program has been assembled into machine code but has not been linked and otherwise processed to the stage where it is directly executable by the computer system's CPU.

In a step 12 of FIG. 1, a number of computer system vendors produce computer systems which conform to both the BCS and the OCS. In a step 14, software developers write application programs which conform to the BCS and the OCS to ensure that their application program will run on any vendor's certified compatible computer system.

It should be noted that the steps 12 and 14 of FIG. 1 can occur concurrently or sequentially. Since the BCS and the OCS specify a defined interface in as predetermined set of system rules, system compatibility is ensured as long as the hardware system, operating system and application programs follow the defined interface. In many cases, hardware, operating system and application program development occur in parallel to minimize the time to market for a complete system.

The present invention has been reduced to practice on computer systems based upon the Motorola 88000 series of RISC microprocessors and more particularly upon the Motorola MC88100 microprocessor. A manual describing the MC88100 microprocessor is available from Motorola, Inc. as "MC88100 RISC MICRO- PROCESSOR USER'S MANUAL, Second Edition, MC88100UM/AD, Rev. 1.

A BCS in accordance with the present invention has been developed for the MC88100 microprocessor which defines the minimum interface which must be supported in the hardware and operating system to maintain conformance with a set of system compatibility rules. An OCS has also been developed for the same microprocessor which defines the minimum interface for system libraries and procedures. It should be noted that the BCS and the OCS are not an exclusive list for hardware and operating system vendors: they can design their systems to include features which are not included in the BCS and OCS as long as their systems, at a minimum, support all of the features of the BCS and the OCS.

A manual describing the BCS is available from the 88open Consortium Ltd., 2099 Gateway Place, Suite 300, San Jose, Calif. 95110 as *Binary Compatibility Standard (BCS)*, release 1.1, April 1990. The BCS manual specifies the BCS for systems based upon the Motorola MC88100 and future related microprocessors. It provides for the portability of application software at the binary level by specifying interfaces between the binary file and the operating system and by providing data interchange standards for installing software from removable media. The BCS manual defines file formats and the data structures, system call numbers and return registers for the allowable system commands. An example of a BCS system call specification taken from page 60 of *Binary Compatibility Standard (BCS)* is shown below in Table 1:

TABLE 1

| A BCS System Call Specification |
|---|
| 9.3 chdir - Change Current Working Directory |
| 9.3.1 Synopis |
|     int chdir(path) |
|         char *path;    /* r2 */ |
| 9.3.2 Description |
| The chdir ( ) system call causes the named directory to become the current working directory, that is, the starting point for path searches of pathnames not beginning with slash. |
| 9.3.3 Data Structures |
| None. |
| 9.3.4 Data Definitions |
| None. |
| 9.3.5 System Call Number |
| 3 |
| 9.3.6 Return Register |
| r2 |
| 9.3.7 References |
| See the POSIX section 5.2.1 description of the chdir ( ) function. |

A manual describing the OCS is available from the 88open Consortium Ltd. as *Object Compatibility Standard (OCS)*, release 1.1, April 1990. The OCS manual specifies the object compatibility requirements for conforming systems based upon the Motorola MC88100 microprocessor and future related microprocessors. Among the standards specified are the assembly language syntax, low level interfaces, object file formats and the various library calls. An example of an OCS procedure call taken from page 201 of *Object Compatibility Standard (BCS)* is shown below in Table 2:

TABLE 2

| An OCS Procedure Call Specification |
|---|
| 8.1.5.317 readlink |
| NAME |
|     readlink - read value of a symbolic link |

TABLE 2-continued

| An OCS Procedure Call Specification |
|---|
| SYNOPSIS |
|     int readlink (path, buf, bufsize) |
|     char *path; |
|     char *buf; |
|     int bufsize; |
| REFERENCE |
|     For description, see BCS R1.1. 9.73 |

Figure 2:
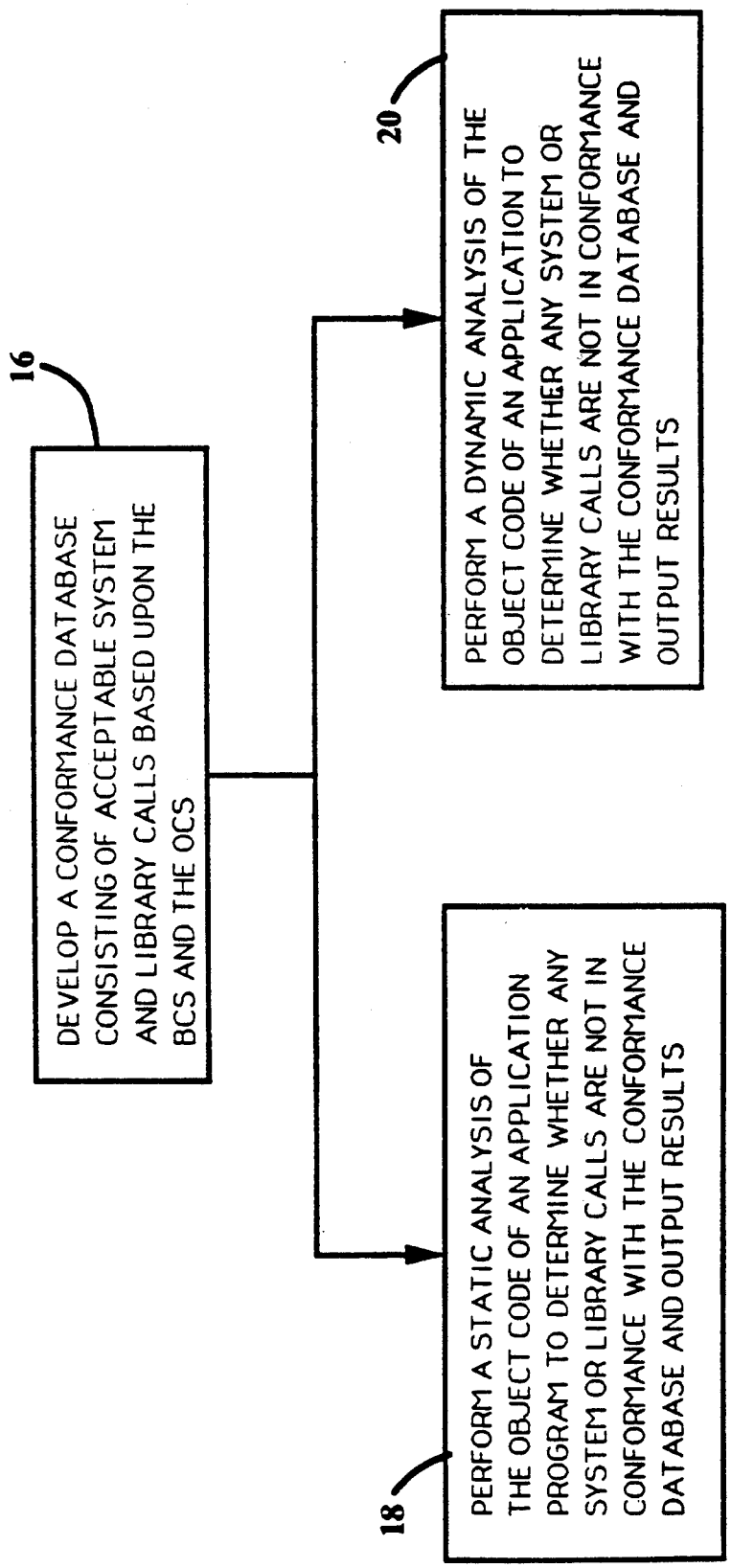
FIG. 2 is a flow diagram of a method for verifying the conformance of an application program to a set of system rules.

In FIG. 2 a flow diagram illustrates a process for verifying the conformance of application programs to the set of system compatibility rules. In a first step 16, a conformance database is developed from the BCS and the OCS. A static analysis is made of the executable binary code or an object module of the application program in a step 18 to determine whether there are any static violations of the system compatibility rules. Also, a dynamic analysis is made in a step 20 to determine whether there are any run-time violations of the system compatibility rules. If neither the static analysis nor the dynamic analysis detect incompatibilities the application can certified as statically and dynamically compatible with any certified compatible computer system. Additional tests may also be run to detect other forms of system compatibility such as magnetic tape format compatibility, network compatibility, etc.

When presented with an object module, SBV utilizes the OCS rules and when presented with an executable SBV utilizes the BCS rules. DBV, as a default, always uses the BCS rules since it deals with executables. As a debugging option, both SBV and DBV can be made to apply OCS rules to executables.

Figure 3:
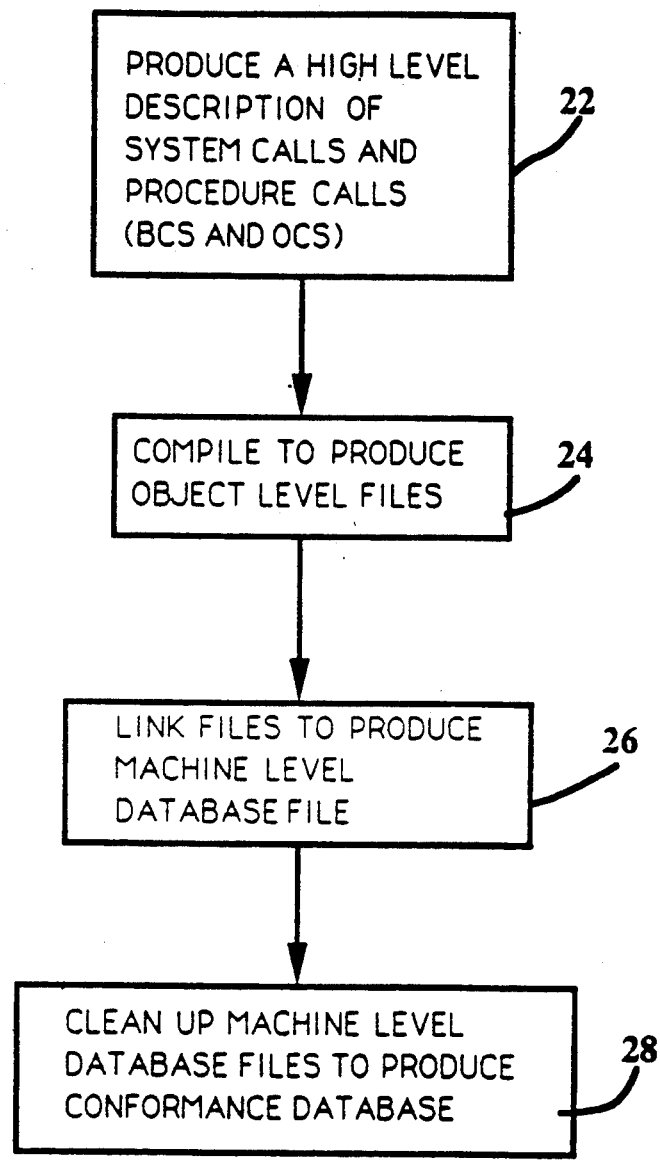
FIG. 3 is a flow diagram of a method for producing a conformance database.

FIG. 3 is a flow diagram of the develop conformance database step of FIG. 2. In a first step 22, the BCS and the OCS rules are input into a computer system in a high-level database description language. The database description language is compiled to produce object level files in a step 24 and the files are linked in a step 26 to produce a raw conformance database file at the binary level. Finally, the raw conformance database file is cleaned in a step 28 to produce the conformance database file used in the static and dynamic analysis steps. This cleaning step recognizes the fact that whenever you describe a large, complex database in a high-level language that errors will be present in the compiled code. System test are run which exercise every portion of the database to identify these errors for correction or removal from the database.

The conformance database file of the present invention which includes BCS and OCS rules includes more than 9000 lines of code. A small subset of the source code of the conformance database file as developed in step 22 is shown below in Table 3.

TABLE 3

| Portion of Source Code for Conformance Database File |
|---|
| LEVELS    BCS, STREAMS, TAPE, BCSNA, BCSLK, |
|                 BCSJCTL, OCS, OCSNA, OCSXA, |
|                 OCSLK, OCSJCTL |
| MAX_PID = 32000 |
| FD_MAX = 25 |
| pid_t   = [ 1:MAX_PID] |
| fd_ret_t =[−1 : FD_MAX] |
| openset1 = {  O_RDONLY, O_WRONLY, 0_RDWR. |
|                  O_NDELAY. O_NONBLOCK. O_APPEND, |
|                  O_TRUNC, O_EXCL, O_NOCTTY, |
|                  O_SYNC } |
| - note openset 2 is same as openset1 with addition of O_CREAT |
| openset2 = {  O_RDONLY, O_WRONLY, 0_RDWR. |

TABLE 3-continued

Portion of Source Code for Conformance Database File

```
                O_NDELAY, O_NONBLOCK, O_APPEND,
                O_TRUNC, O_EXCL, O_NOCTTY,
                O_SYNC, O_CREAT }
mode_t   = {    S_IRUSR, S_IWUSR, S_IXUSR, S_IRGRP,
                S_IWGRP, S_IXGRP, S_IROTH, S_IWOTH,
                S_IXOTH, S_ISUID, S_ISGID, S_ISVTX ]
SYSCALL getpid 20 BCS
    ARG path PATH
    SRG oflag openset2
    ARG mode mode_t
    RETURNS fd_ret_t
ENDCALL
SYSCALL open 32 BCS
    ARG path PATH
    SRG onflag openset1
    RETURNS fd_ret_t
ENDCALL
PROC open OCS
    ARG path PATH
    SRG oflag oepnset1
    RETURNS int
ENDPROC
PROC open OCS
    ARG path PATH
    SRG oflag openset2
    ARG mode mode_t
    RETURNS int
ENDPROC
```

The partial conformance database source code listing of Table 3 uses the following formats:

| | |
|---|---|
| Definitions are given by | NAME=value |
| Ranges are given by | NAME=[min...max] |
| Lists are given by | NAME=val1, val2, ..., valn |
| Bit sets are defined by | NAME={bitmask1, bitmask2, ..., bitmaskn} |

Comments are prefaced by "--" and are terminated by the end of the line.

In Table 3, both system calls and procedure definitions are shown. SYSLOCAL definitions are not shown in Table 3, but are similar to system calls with the addition of a vendor ID parameter. PATH is a built-in type, i.e. one which is known to the database compiler.

Each of the system calls is given a system call number. For example, getpid( ) is assigned system call #20 and open( ) is given system call #32. The fact that there are two SYSCALL and two PROC entries for open( ) indicates that open( ) is a variable argument system call where the number or types of its arguments is dependent upon the value of another argument. The argument which determines the call form is identified by the SRG (Special aRGument) instead of the ARG (ARGument) preceding the argument description in the database entry.

Figure 4:
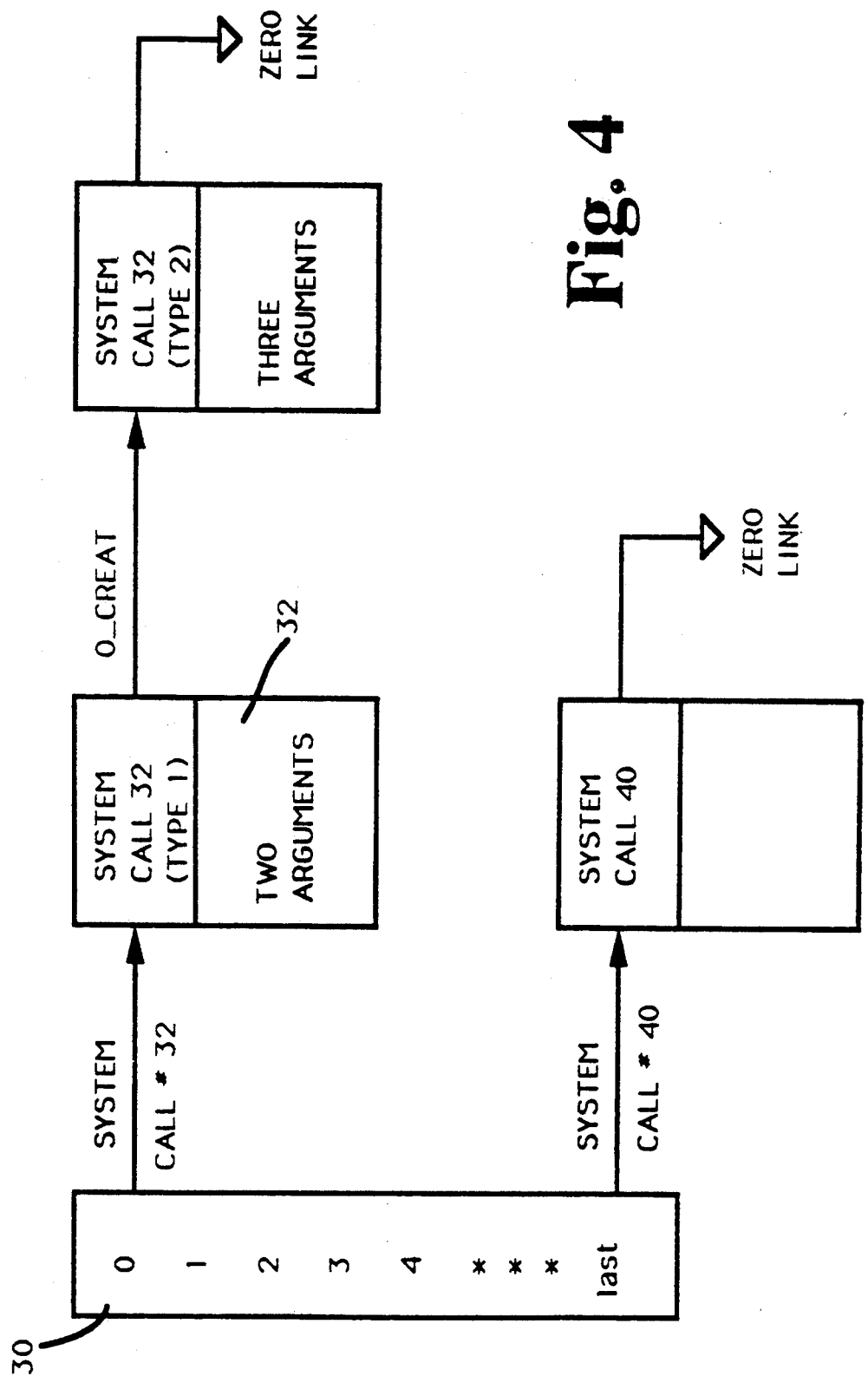
FIG. 4 is a diagram of a system call structure of the conformance database.
Figure 5:
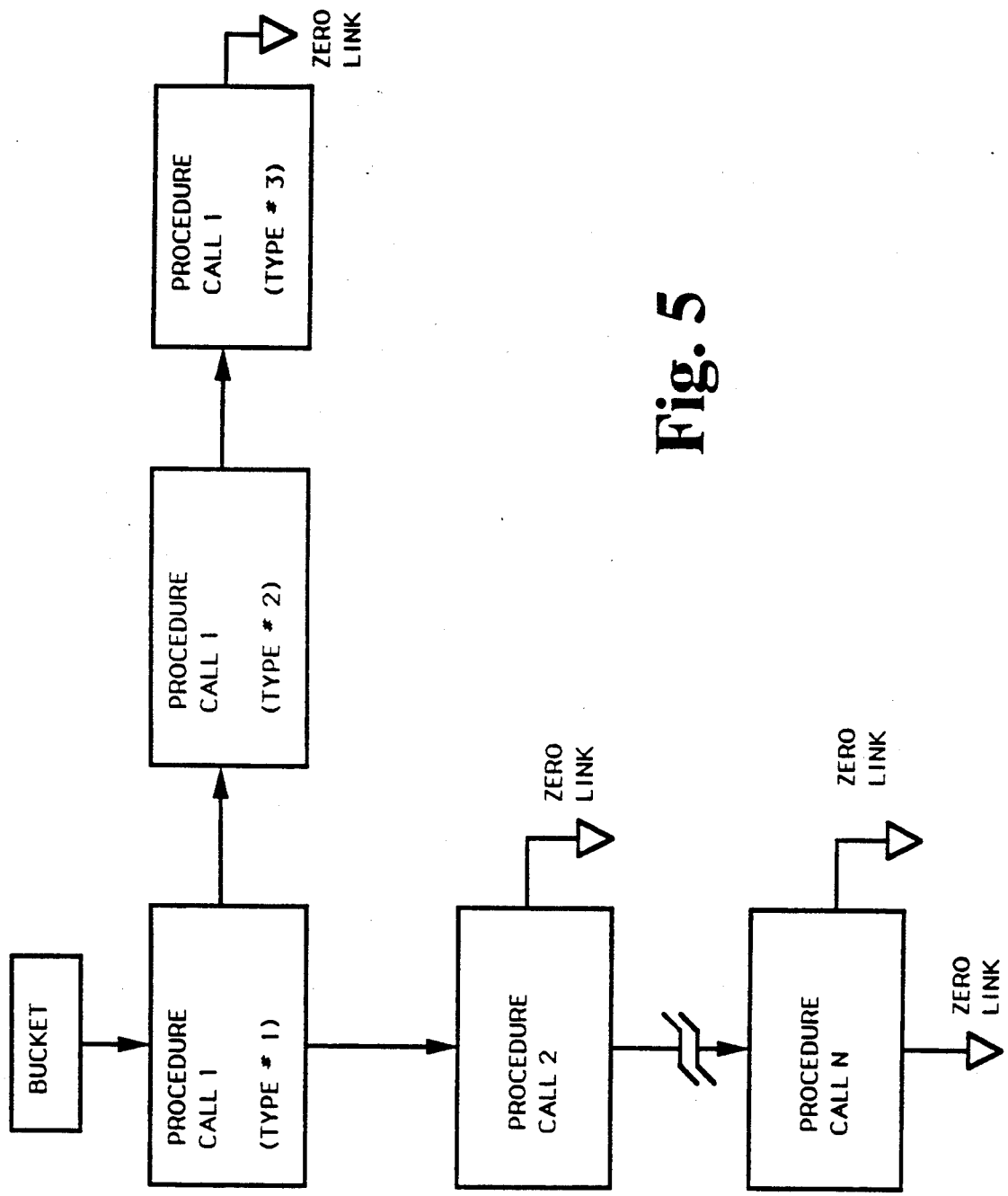
FIG. 5 is a diagram of a procedure call structure of the conformance database.

FIGS. 4 and 5 illustrate the a preferred data structure for the conformance database files. More specifically, FIG. 4 shows the data structure for system calls while FIG. 5 shows the data structure for procedure or library calls. These data structures are produced from the high level database language of step 22 by a database compiler. The compilation in the present embodiment is accomplished in several steps: the high level database language is first compiled into assembly language and then it is assembled into object modules which can be ultimately linked to form the database.

In FIG. 4, the first portion of the system call data structure is a pointer table 30 of system call numbers. As mentioned previously, each system call is assigned a unique system call number in the BCS rules which is passed in register 9 of the MC88100. Each system call includes a pointer which points to a data object, such as a data object 32, which describes that call type. If a system call has several "flavors" or types, the system call pointer table will point to the first type data object for that system call, the first type data object with point to the second type data object for that system call, etc. The final type data object for the system call will terminate in a zero link or null to indicate that there are no further types of that system call.

For example, in FIG. 4 the call number 32 corresponds to the system call open( ). This system call has two flavors or types, namely, a two argument type and a three argument type. A flag bit "O_CREAT" differentiates between the two. The system call pointer table will point to a first data object which describes the first type of open( ) call and the first data object will point to a second data object which describes the second type of open( ) call. The second data object terminates in a zero link to indicate that no further types of open( ) are specified within the system call data structure. As another example, the call number 40 corresponds to the system call read( ). This system call has only a single type, so there is only one data object pointed to by the system call pointer table.

The data objects within the database include a list of acceptable arguments, their ranges and which subsets of the standards are required to use it. For example, if an application program utilizes networking or X-windows the conformance database can be used to ensure the conforming use of those features. This list of required options is used to ensure that the target system will execute the application program, i.e. the "required option list" is part of the application's certification. For example, an application might be certified to run on systems which support the symbolic link feature. If the target system does not support symbolic links, the application will not run.

As another example, some system calls include options which are supported by the standard if they are set up properly. The open( ) system call is an example of this. The system rules specify that a conforming operating system must support a minimum of twenty-five open files. A conforming application program must not use more than twenty-five open files to ensure portability unless the application program first checks with the operating system to see if more open files are allowable. In other words, an open( ) command for a twenty-sixth file is invalid if the operating system is not checked, but may be valid if the operating system is checked and supports more than twenty-file open files. The conformance database keeps track of such options.

It should be noted that some of the option checking is test specific, i.e. it may not be implemented in both SBV and DBV. For example, the option checking for the open( ) command described above is DBV specific, although conformance levels are common to both SBV and DBV. The important point is that the application program must adhere to the list of required options to ensure that the target system will properly execute the program.

In FIG. 5, the data structure for the procedure calls is different from the data structure for the system calls. Unlike system calls, procedure calls are called by name rather than by call number. It should be noted that application programs typically always make procedure calls rather than system calls. For example, an application developer will make the command "open( )" which will call a library routine which ultimately resolves down to the system call #32.

The set of rules used to analyze the call is dependent upon the format of the application program being analyzed. If the application is provided as object code, then the OCS rules apply. If the application is provided in binary form, then the OCS rules don't apply and the BCS rules are used for certification. It is therefore necessary to analyze the manner in which OCS libraries make system calls and the manner in which binary programs make system calls.

As mentioned previously, procedure calls are called by name. Since there are potentially thousands of different procedure calls it is desirable to have a process for quickly identifying the data objects corresponding to a particular procedure call. In the present embodiment, an "open addressing" form of hashing is used to quickly identify the desired procedure call. The hash table is formed by mathematically transforming a portion of the procedure name to create an essentially random number corresponding to one of a number of storage locations or "buckets" for the data objects. For example, the first three characters of the names can be changed to their numeric forms, multiplied together, divided by their range and multiplied by the number of buckets to determine their assigned bucket number. The search for the desired procedure is therefore reduced to a search of the desired procedure's bucket. Since there are typically several hundred buckets for the several thousands of procedure calls, the use of the hash table will increase the speed of the search by a large factor.

To find data in the data structure of FIG. 5, the name of the procedure is first used to identify the appropriate bucket. Then the procedure calls within the bucket are examined one-by-one until the desired procedure call is found. Once the procedure call has been located, the appropriate flavor or type of that procedure call is identified if the procedure call has subtypes. Again, the data objects within the database include a list of acceptable arguments, their ranges and which subsets of the standards are required to use it.

Figure 6:
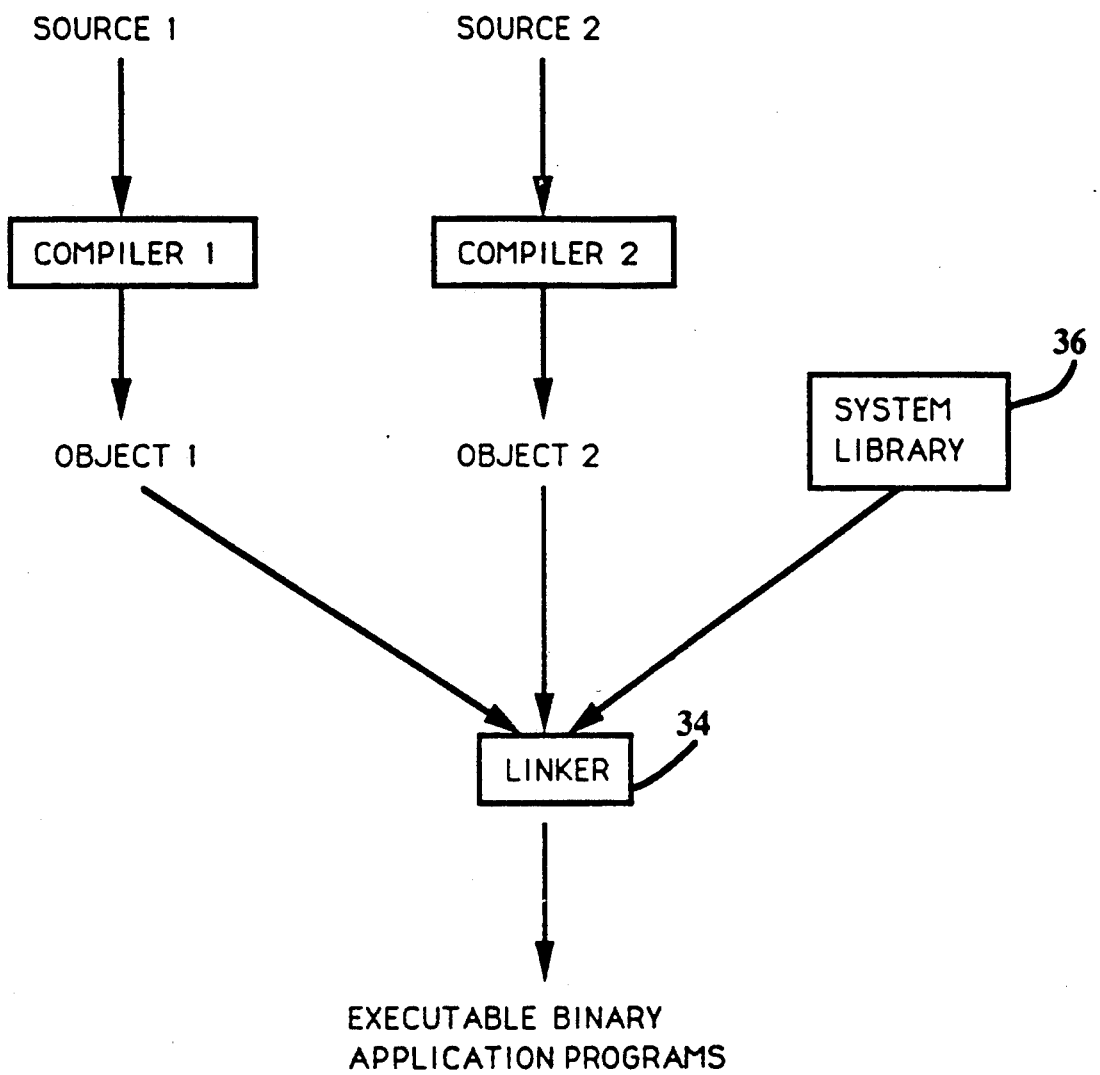
FIG. 6 is a diagram used to illustrate the various levels at which static analysis can be performed on an application program.

FIG. 6 illustrates the various levels at which the static analysis of the application program can take place. Source code SOURCE 1 and source code SOURCE 2 may be written by the same vendor or by different vendors and is typically written in a high-level language such as C. SOURCE 1 is compiled in COMPILER 1 to create object code OBJECT 1 and SOURCE 2 is compiled in COMPILER 2 to create object code OBJECT 2. COMPILER 1 and COMPILER 2 can be the same or different compilers as long as they produce object code which conforms to the set of system rules defined by the BCS and the OCS. Since OBJECT 1 and OBJECT 2 conform to BCS and OCS they can be linked together by a linker 34 along with procedures from a system library 36 to produce the executable binary code of the application program.

The static analysis of an application program can take place at either the object level (e.g. on OBJECT 1 and OBJECT 2) or at the executable binary level. The static analysis can be performed at either (or both) levels because the object code and the executable binary code are never actually executed, i.e. their code is analyzed as data by an executing static analysis program referred to herein as the static binary verifier or "SBV".

Figure 7:
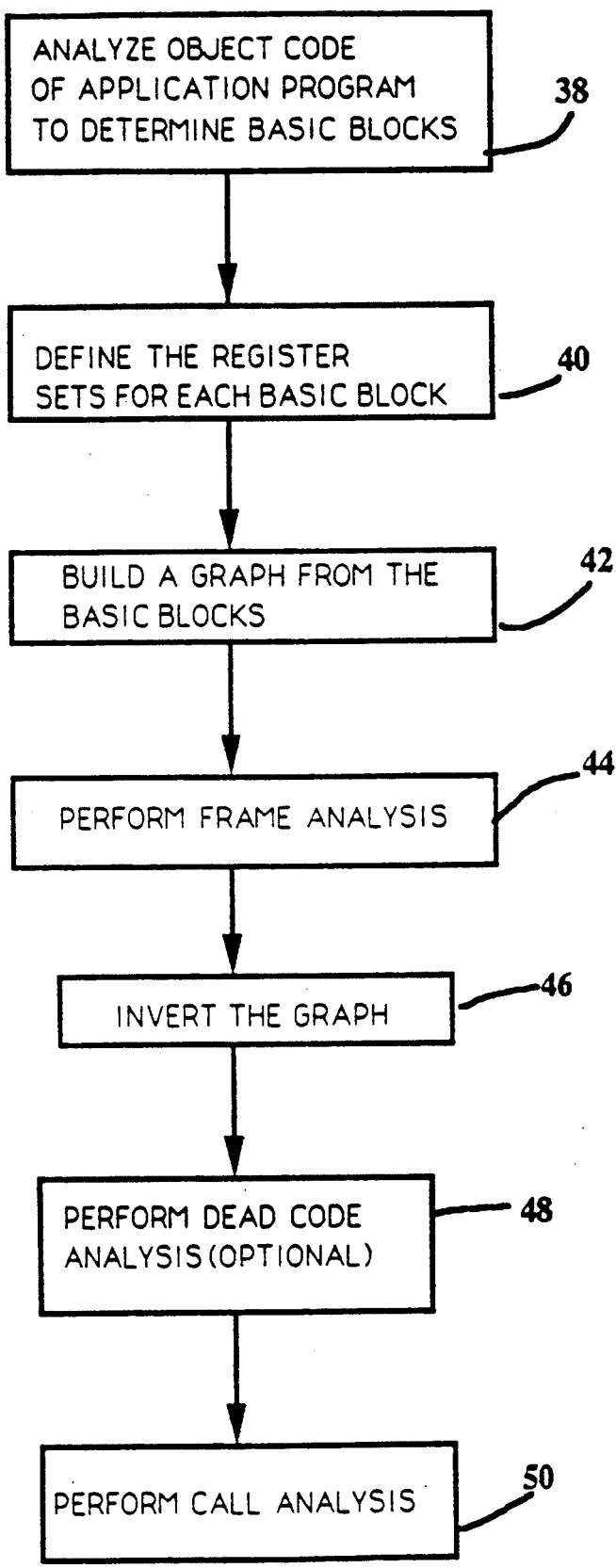
FIG. 7 is a flow diagram of a method for static analysis of an application program.
Figure 8:
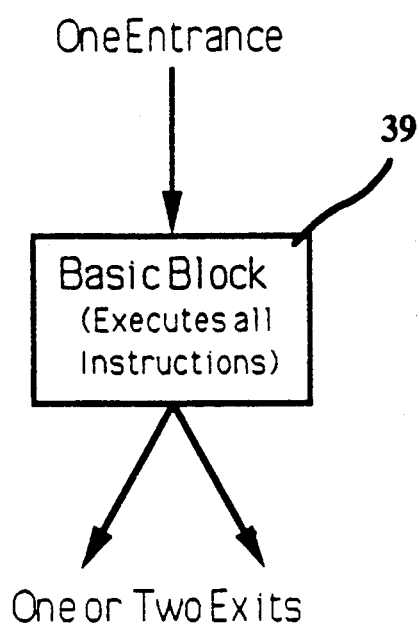
FIG. 8 illustrates a basic block of an application program.
Figure 9:
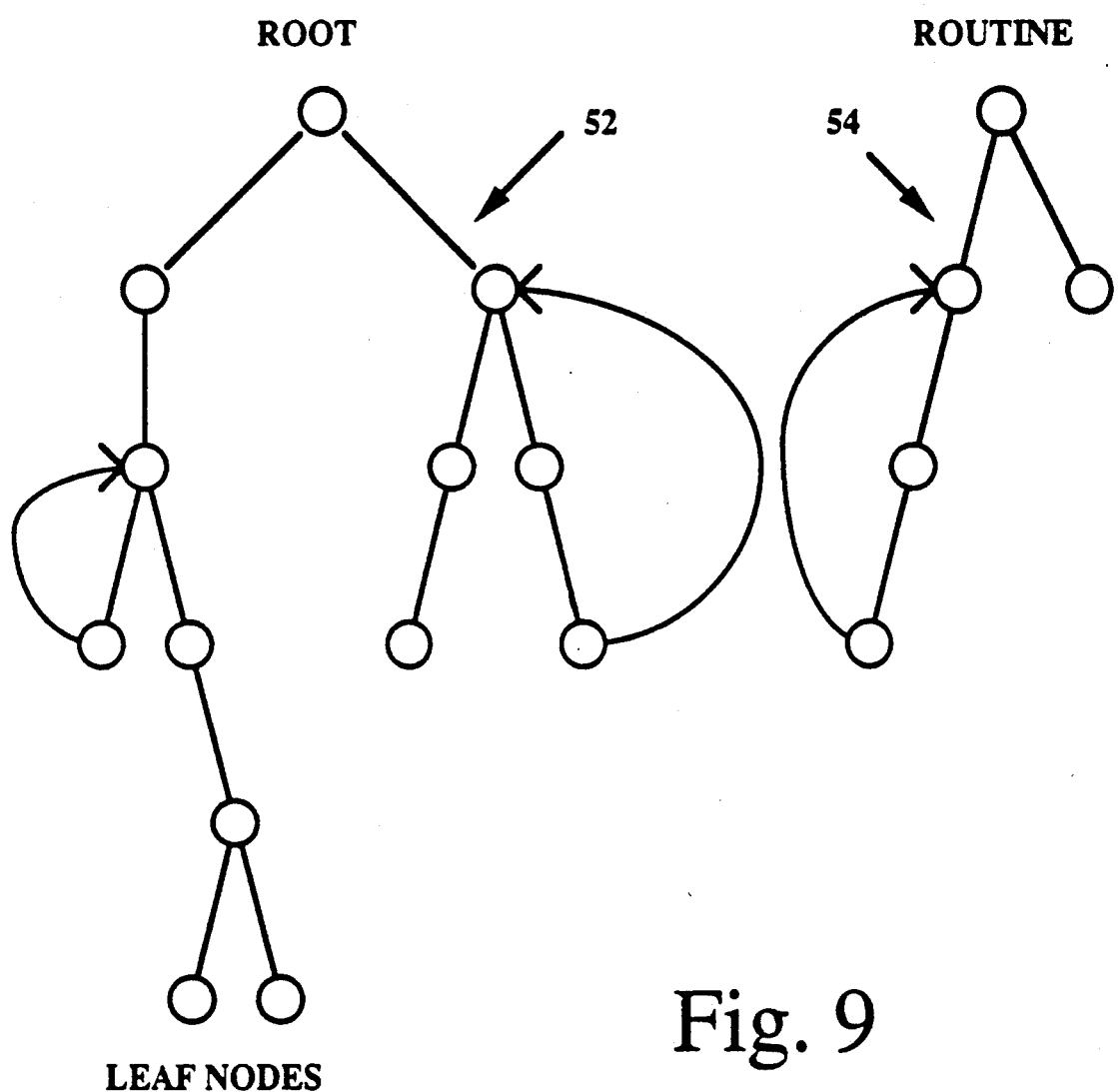
FIG. 9 is a graph of a forest of basic blocks.

The SBV program is illustrated in the flow diagram of FIG. 7. In a first step 38, the code is analyzed to determine basic blocks within the program. With brief reference to FIG. 8, a basic block 39 is a collection of code which has one entrance, one or two exits and in which all instructions between its entrance and exit are executed. Next, in a step 40, the register sets used for each basic block is determined. In a step 42, a graph such at the graph shown in FIG. 9 is built from the basic blocks by producing a series of pointers which indicate the direction of execution flow between the basic blocks. Frame analysis is performed in a step 44. In a step 46 the graph is inverted by reversing the direction of the pointers and in an optional step 48 the inverted graph is subjected to dead code analysis. Finally, call analysis is performed in a step 50 on the inverted graph to determine whether the program is in static conformance with the conformance database. Since SBV does not execute the application, all values for a particular call may not be known. As a result, runtime non-conformities are not detected by SBV.

The SBV program accepts a Common Object File Format (COFF) as defined in the OCS and somewhat in the UNIX System 5 specifications, i.e. either an object file (.o) or an executable binary file. In a COFF object, the basic layout is as follows:
  header
  text section data
  data section data
  bss section data (uninitialized data)
  symbol table
  string table Each section has two important address, namely, where it should be loaded in memory (the virtual address) and where it resides on disk (the file address). In the preferred embodiment of the present invention, it is required that the virtual address modulo 64K be the same as the file address modulo 64K to allow for easy demand paging, although this is a DBV issue and will be discussed in greater detail subsequently.

In the present embodiment the SBV program comprises four major components: an object reader, a database manager, a graph builder and an analyzer. The object reader OMODMGR.C reads the object file code, places it in memory, reads the symbol table and sets up global pointers to selected datum in the object file code. OMODMGR.C also contains functions for looking up names and other utility type procedures.

The database manager DBMGR.C reads the conformance database. A principal function of the database manager is to relocate the conformance database once it has been read into the memory. As explained previously, the conformance database is an elaborate data structure which contains internally relative indices which must be converted into pointers for use by the SBV program. Another function of the database manager is to create and manage the hash table of library names as described previously. Utility functions are also provided to access the hash table.

The graph builder GRAPH.C and related modules comprise the bulk of the computational effort of the SBV program. Within GRAPH.C the basic blocks are built and sorted and a Directed Acyclic Graph (DAG) is built, inverted and traversed. A DAG has basic blocks as its nodes and does not traverse the "back edges", i.e. the directed pointers point back in the graph.

A block analyzer PROCBLK.C determines the live and dead registers of each basic block and maintains a list of register values that can be determined for each basic block. In addition, PROCBLK.C registers copy propagation flags and checks for errors such as frame errors (e.g. references outside of the frame). Since the graph builder is responsible for traversing the graph, it is also responsible for directing the analysis portion of SBV.

The analyzer CHECK_CALL.C and FRAME_C verifies and validates the system and library calls in the application and validates certain aspects of the frame. CHECK_CALL.C interacts with the conformance database and the graph to determine whether or not register and register values are set up correctly for library and system calls. Each path leading to a particular library call or system call is validated independently.

The program SBV includes other modules which perform utility or support functions for the main modules described above. For example, REC.C recognizes instructions. OUT.C takes an instruction returned by REC.C and formats a string suitable for printing. ERRMGR.C collects error messages produced by CHECK_CALL.C.

As mention previously, SBV is used to analyze, verify and validate system and library calls in binary executable application programs. This verification and validation is necessary to increase the probability that the binary application will be portable to other similarly configured systems without change. SBV does not ensure that the application will perform correctly but only that the application conforms the BCS and OCS standards.

As also mentioned previously SBV does not execute the application. Therefore, all of the values for a particular call may not be known. In many cases, SBV can determine argument values, data types and the number of arguments being passed in each call. However, it is not always possible for SBV to determine a value that is required to validate a call.

The classes of errors that SBV can detect are as follows: 1) illegal instructions, register uses, trap instructions, etc.; 2) calling sequence errors for library and system calls, poorly formed argument lists and, in many cases, illegal or improper argument values; and 3) various types of frame errors.

The SBV program has unique features not found in the prior art. First, the SBV program performs its analysis on the binary code of the application program, while prior art verification programs such as the Application Source Verifier (ASV) of AT&T verify the source code of application programs. Secondly, the static analysis performed by SBV uses a different type of logic and flow control than that used by compilers and other programs with analysis capabilities.

As mentioned above, prior art application verifiers operate on the source code of an application program. As a result, prior art application verifiers must perform many compiler-like functions such as lexing and parsing before being able to analyze the program. Also, since they work with source code, prior art application verifiers tend to be language specific. Since SBV analyzes the binary code of the application program it eliminates the need for performing these compiler-like functions and, additionally, is high-level language independent.

Referring again to FIG. 7, the first step 38 undertaken by SBV is to analyze the code to determine basic blocks. As described above, a basic block is one which has a single entry, one or two exit points and in which all instructions are executed prior to exit. In the case of the MC88100 systems supported in this preferred embodiment, the last instruction in a block will be an unconditional branch, a conditional branch, a trap, or a call or be followed by a branch or call target.

The define register sets step 40 determines for each basic block the inset, the outset, and the killset. The inset is the set of registers having values which are used prior to being redefined. The outset is a set of registers which contain values determinable by SBV that are valid when the block exits. The killset is a set of registers that are redefined in the block with a value which is not determinable by SBV. The set of live registers at the exit of the block is the union of the outset and killset. Each basic block is annotated with a list of outset members and their respective values. Another register set which is incidently maintained is the copyset. If a register is copied to another register, the second register becomes part of the copyset and its value, if applicable, is propagated to the next basic block.

In summary, the define register sets step 40 determines all of the following for each basic block of the application program:
1) which registers are assigned known values on the exit from the block and what those values are;
2) which registers are assigned unknown (i.e. non-statistically deterministic) values;
3) which register values are moved from one register to another by the block;
4) which registers are preserved by the block, either by non-use or because they have been saved and restored; and
5) which register values are used within the block.

The build graph step 42 of FIG. 7 sequentially scans the basic block list and sets up target and follower pointers. A target pointer is a pointer to another block that contains the destination of a call or branch. A follower pointer is a pointer to a basic block which sequentially follows the current block. If a block ends with an unconditional branch the follower pointer will be null. A target block is determined by scanning the basic block list and matching the candidate block's starting address with the destination address of the call or branch instruction. If there is not match, then the object is not fully resolved and the target pointer is set to a null. The data structure is a directed graph as shown in FIG. 9. At this point in the analysis the control flow structure is complete and the target and follower pointers are a static representation of the flow of control within the application.

The basic block list is traversed sequentially in a step 44 and if a block has been flagged as being visited then frame analysis is performed. If a block ends in a system call it is analyzed for conformance with the conformance database. If the block ends in an procedure call to a library routine then the procedure call is analyzed. It should be noted that the library routine calls can be analyzed even in partially resolved objects since the name of the target routine is available to the SBV program.

The frame is an area of storage allocated when a procedure becomes active and deallocated when the procedure becomes inactive. A stack frame is usually used for this purpose. Three types of errors are checked during frame analysis: 1) loads and stores based on the stack pointer but referring to objects outside the stack frame; 2) frame size too small; and illegal register uses. In the present invention, the stack from is too small if the procedure contains procedure calls and the frame is less than 32 bytes. An example of an illegal register use is not saving a volatile register prior to use.

The next step 46 is block inversion. Each basic block is annotated with a list of its immediate predecessors. This is accomplished by traversing the basic block list sequentially and, for each block, annotating the target or follower blocks with a pointer to the current block. The current block is an immediate predecessor to each of the follower and target blocks.

Next, dead code analysis is optionally performed in a step 48. Referring again to FIG. 9, the graph includes a "forest" of two "trees" 52 and 54, where tree 54 is unreachable from the starting point ROOT of main tree 52. It is desirable, but not required, to remove this unreachable tree 54, i.e. to remove dead code that can never be executed. Another way of thinking about this problem is that dead code is a basic block which is not reachable through target and follower pointers when starting from the program's entry point.

A method for identifying dead code in accordance with the present invention involves recursively traversing the basic block list by following the target and follower pointers. As each block is encountered it is flagged as being "visited." This visited flag serves two purposes: 1) it is used to prevent infinite recursion; and 2) it is used to indicate which nodes are reachable from the beginning of the program, i.e. ROOT. After the recursive traversal has been completed, the basic block list is scanned sequentially. Every block that is not flagged as being visited is reported as dead code.

Figure 11:
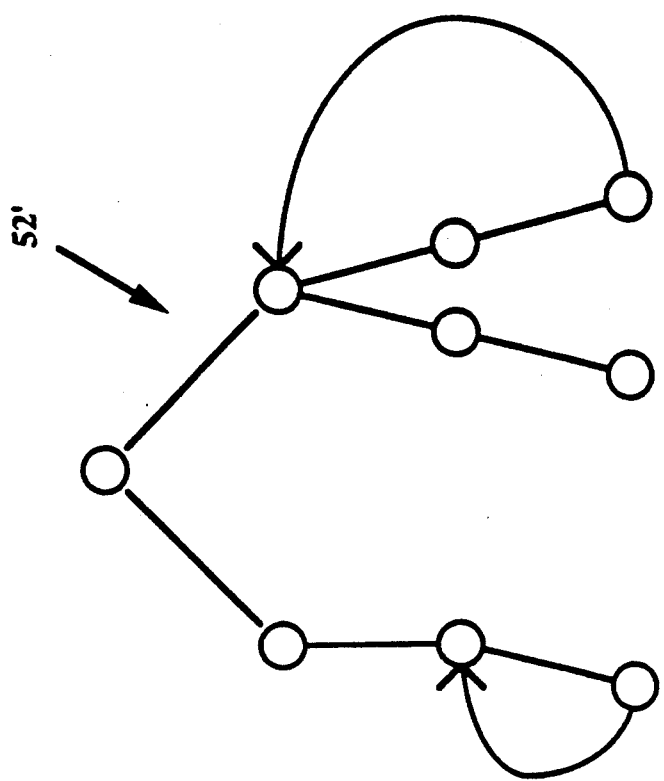
FIG. 11 is a graph after the tree of FIG. 10 has been pruned.
Figure 10:
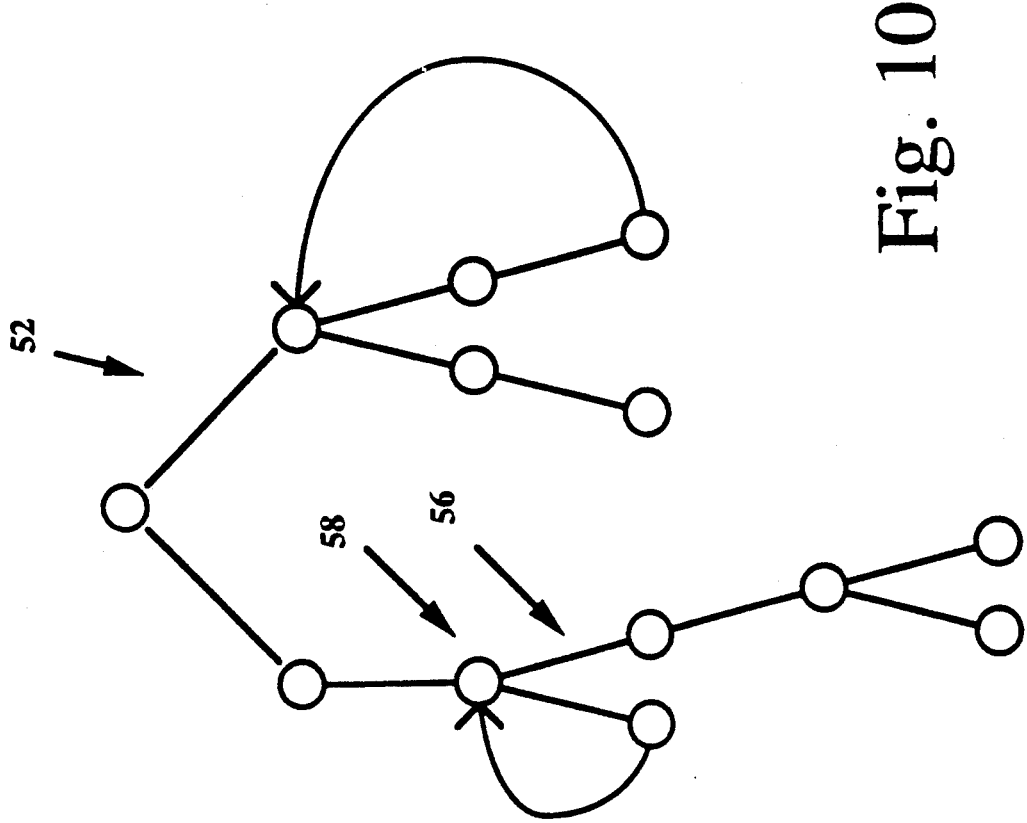
FIG. 10 is a graph of a tree which results from the removal of dead code from the forest of FIG. 9.

In FIG. 10, the tree 52 resulting from the removal of the dead code tree 54 from the forest of FIG. 9 is further traversed to look for dead branches. A dead branch is a path 56 within the tree which is never executed due to a conditional branch which can never meet the condition for that path. For example, if a conditional branch is made at a node 58 when the content of a register is zero, but the basic block terminating in the conditional branch sets that register to 1 just before the branch, the conditional branch is never made and that path of the tree will never be executed. In such cases, the branch 56 can be removed to produce the "pruned" tree 52' of FIG. 11.

The final step 50 of SBV is external call analysis which includes an analysis of both system calls and library calls. The two forms of calls are treated separately and reference different parts of the conformance database but are analyzed in a similar manner as follows. Each unique path leading to a call site is checked to see if the register/arguments are set up correctly and to check the argument values if possible. A path is set of predecessor (sometimes called ancestor) blocks leading to the call site.

An ancestor list is generated by annotating each basic block with a list of immediate predecessors. The ancestor list has two parts: 1) a sub-list pointing to each ancestor block; and 2) a sub-list of indices of immediate predecessors for each corresponding ancestor. The two sub-lists are initialized such that the ancestor pointer list contains the first immediate predecessor for each ancestor beginning with the basic block containing the call. The immediate predecessor index sub-list contains all zeros. That is, the pointer list contains the zeroth immediate predecessor for each ancestor.

When the next list of predecessors is required, the last index in the index sub-list is incremented and compared against the number of immediate predecessors for that block. If the list of immediate predecessors is not exhausted in the last ancestor, the last pointer is replaced with the next immediate predecessor of the last ancestor. If the list of immediate predecessors of the last ancestor is exhausted, the last ancestor is popped off the end of the list and the process begins again with the second to last ancestor. This process continues until all unique paths have been exhausted which is indicated by popping off the first (zeroth) list member.

A unique path is a path leading to a particular call site that is different from all other paths leading to that call site. For example, if a call site has three immediate predecessors, and each of these has three predecessors, and each of those have three predecessors there are twenty-seven unique paths to that call site. If the path depth is not limited in some fashion, there are be thousands of unique, and probably irrelevant, paths to a particular call site for even a small application.

As an option, each path can be traversed downwardly towards the system or procedure call. As the path is traversed, register values can be propagated according to the information obtained during the basic block analysis. When a basic block which ends with a conditional jump is encountered during this path traversal the entire basic block can be re-evaluated using the current register values. This allows many impossible paths or branches to be pruned from the tree, greatly increasing the efficiency of the routine. This optional step would be performed as a part of the "perform call analysis" step 50 of FIG. 7.

For performance reasons, the path depth default is limited to six levels. Statistically, 95% of the time register/argument values are set up within the first two predecessors of a call site. In 99% of the cases, the register/argument values are set up within the first four ancestors. It would be very rare for a register argument value to be set up more than six predecessors prior to the call site. For this reason, a search depth of six is considered to be a good compromise between the completeness of the SBV test and the amount of memory and time required to run the SBV test. Of course, more levels can be searched with a corresponding reduction in SBV performance.

The call analysis algorithm begins by looking up the call in the conformance database. If the procedure name is not in the database it is determined to be a user procedure and the call analysis terminates.

The next step in call analysis is to set up the initial predecessor list beginning with the block containing the call site and followed by five other ancestors. Next, the current predecessor list is traversed beginning with the block representing the call site followed by the most immediate predecessor, etc. A list of register values is created. The register values list is annotated with a status indicating whether the register is live with a known value, live with an unknown value, or dead. In this way, only the register value set up nearest the call will find its way to the list.

Within the conformance database there may be multiple definitions for each unique library or system call. Some library calls and system calls have different numbers of arguments and argument types depending on the value of the designated argument. Therefore, the next step in the call analysis is to determine the correct database entry within the conformance database.

Once the correct entry has been found within the conformance database the argument values are checked against those in the database. Errors and warnings are issued accordingly. Finally, the next predecessor list for the call in question is generated and the algorithm is repeated beginning with the "find register values step" until all unique paths of the call have been processed.

SBV Operation Example

In order to present an example with errors, a small test program was written in C with the following illegal calls:

int fd=fcntl(0, 0×23, −1);
int fret=fpathconf("bletch", 0);

The first call has one error: the second argument of the file control "fcntl" is not an allowable value. The second call has two errors: it passes a path name to fpathconf as the first argument instead of providing a file descriptor and the second argument is not one of the allowable fpathconf option values.

After compiling the program to create an executable binary file the program SBV was run as follows:

TABLE 4
SBV Sample Run

```
$ SBV test
Please Wait ...
processing file gumby
System call to fcntl: 3 args, in_fcntl [00×10414]
    Invalid subtype (arg 'cmd') for library call, value: 0×17
System call to fpathconf: 2 args, in_fpathconf [00×10b34]
    Arg 'fildes' invalid at 0×10b34, value assigned was 0×401f90
    Arg 'name' invalid at 0×10b34, value assigned was 0×0
                Total Valid ?   Invalid
Systems Calls     8    4   2       2
Standard features used: BCS
```

The error message fcntl indicates that the value for the 'cmd' argument is invalid. Because this argument determines the type and allowable values of the third fcntl argument, it is referred to as a subtype. Since SBV was able to determine that the argument couldn't be valid, it reported an error.

The error message for fpathconf indicates that the value for the argument 'fildes' is invalid. Looking up fpathconf in the BCS or the OCS indicates that a file descriptor was expected. The 'name' argument is also invalid.

While the SBV does a thorough job of analyzing the object code of the application program it cannot determine non-conforming system and library calls having argument which depend upon the execution of the application program. This function is provided by dynamic analysis with a program called the dynamic compatibility verifier (DBV).

Figure 12:
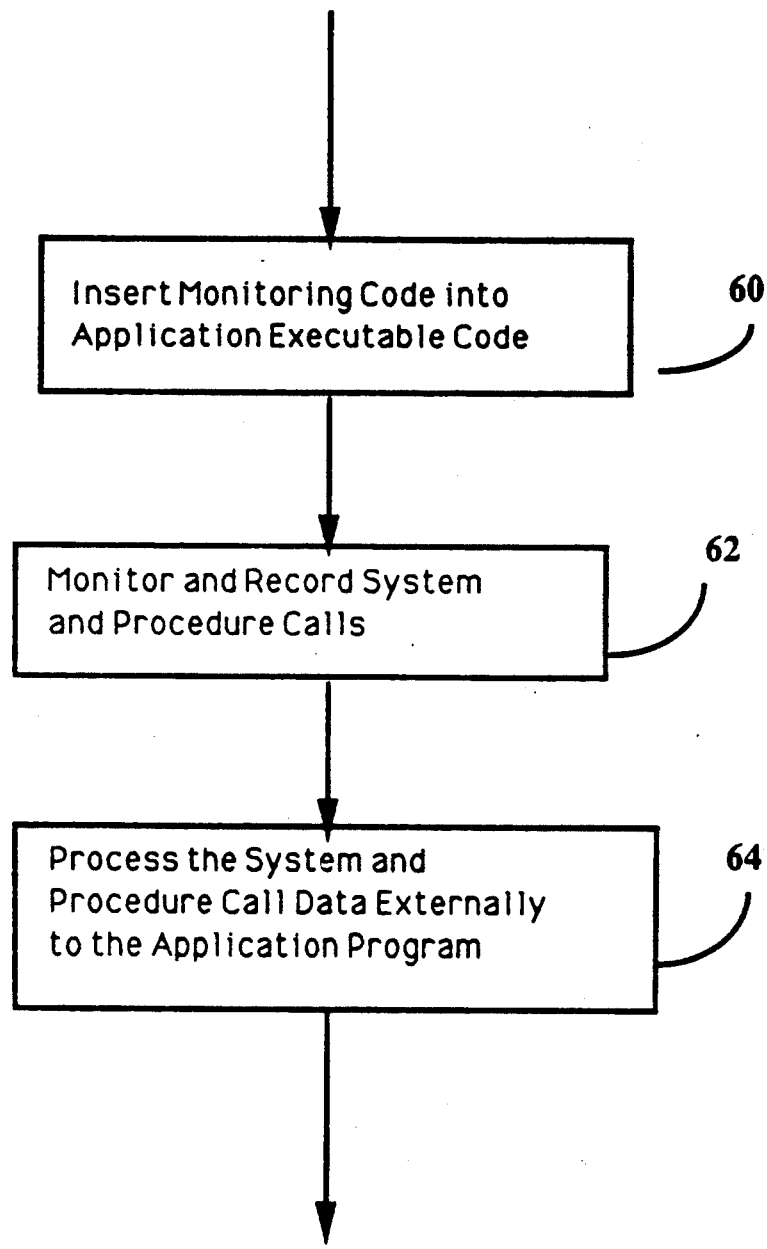
FIG. 12 is a flow diagram a method for dynamically analyzing an application program.

Referring to FIG. 12, in a first step 60 the DBV inserts monitoring code into the application program's executable binary code. The application program is then exercised in a test harness in a step 62 so that the monitoring code can monitor and record system and procedure calls in a log database. Finally, a post-execution program called POST reads the log data base and calculates coverage statistics of the basic blocks and of the system calls, system procedure calls, user procedure calls in a step 64. The coverage statistics determine the confidence level in the DBV test: statistics indicating low basic block and call coverage imply that the DBV test should be run again with a more thorough test harness.

It should be noted that step 60 which inserts the monitoring code into the application program actually transforms the application program into a new entity. The insertion of the monitoring code can be compared to a computer virus in that the operation of the inserted monitoring code merges with the operation of the application program and tends to run invisibly in the background. The monitoring code differs, however, from computer viruses in that it does not reproduce itself by injecting copies of itself into other programs.

Figure 13:
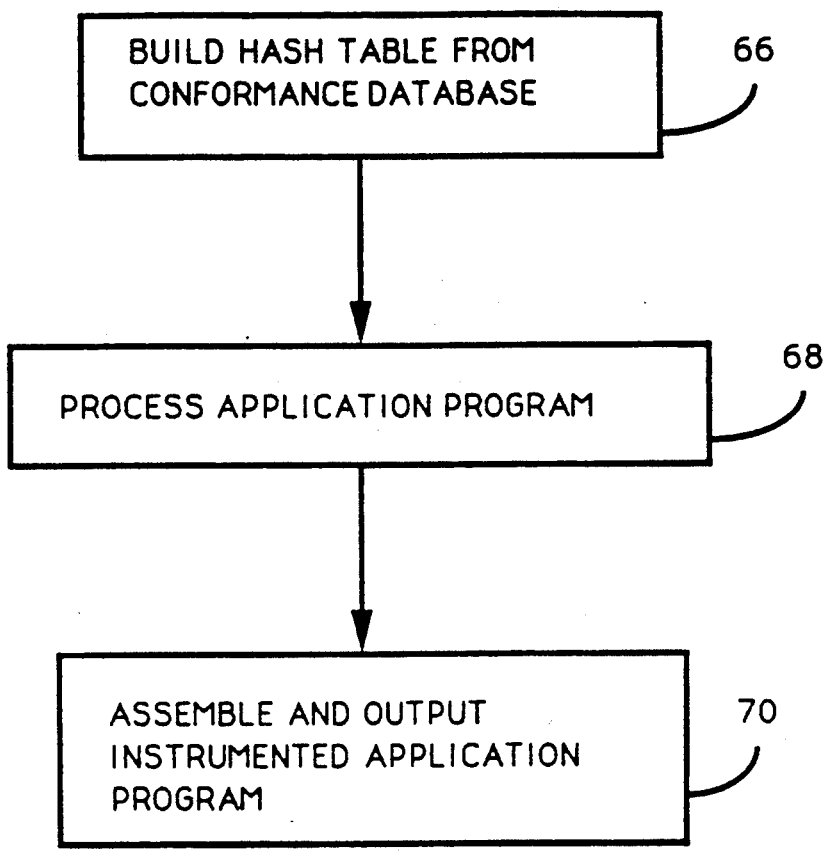
FIG. 13 is a flow diagram detailing the insert monitoring code step of FIG. 12.

The monitoring code can be inserted into the application program as illustrated in FIG. 13. First, a hash table is built from the conformance database in a step 66 as previously described. Next, the application program is analyzed and processed in a step 68. Finally, in a step 70 the application program is assembled with portions of monitoring code and data to form the instrumented application program.

Figure 14:
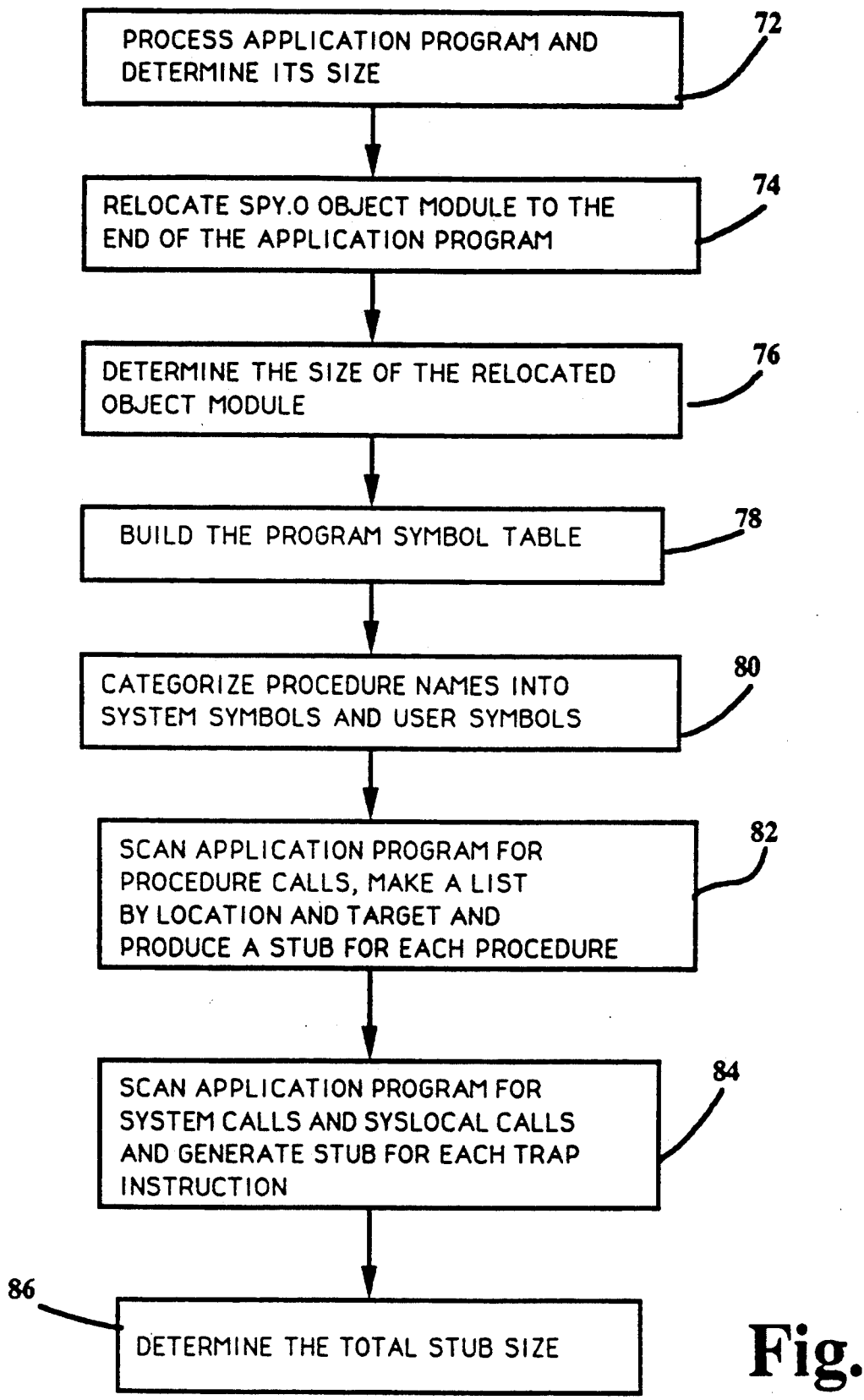
FIG. 14 is a flow diagram detailing the process application program step of FIG. 13.

FIG. 14 illustrates how DBV analyzes and processes the application program. First, the application program is analyzed to determine its size in a step 72. Next, a system loader ld is used to relocate an object module called spy.o (which contains the dynamic verification code) to the end of the input program text in a step 74. The total size of the resultant object module is then determined in a step 76. The resultant object module, like all object modules, includes a text (i.e. instruction) section and a data section which are loaded into separate areas in system memory at execution time. Next, a table of the program symbols is built in a step 78 and then procedure names are categorized into system symbols (which name procedures in the conformance database) or user symbols (which include all other procedures) in a step 80. DBV then scans the input source text for procedure calls (recognized by the bsr or bsr.n instructions) and makes a list of all of the calls by location and target in a step 82. As a call target is listed, a "stub" for that call is also generated and the current total stub size is tallied.

A unique stub is produced for each procedure. A stub for a system procedure can be found below in Table 5 and a stub for a user procedure can be found below in Table 6. These stubs are written in the 88000 assembly language developed by Motorola, Inc.

TABLE 5
Stub for a System Procedure

| subu | r31,r31,0×30     | ; make a frame              |
|------|------------------|-----------------------------|
| st   | r1,r31,0×2c      | ; save return               |
| or.u | r1,r31,0×0000000 | ; plug with hi16(proc)      |
| or   | r1,r1,,0×0000000 | ; plug with lo16(proc)      |
| st   | r1,r31,0×28      | ; save target proc address  |
| or.u | r1,r0,0×0000000  | ; plug with hi16(dbad)      |
| or   | r1,r1,0×0000000  | ; plug with lo16(dbad)      |
| st   | r1,r31,0×24      | ; save database offset proc.|
| bsr  | 0×00000000       | ; plug with check_proc      |
| ld   | r1,r31,0×2c      | ; restore reg               |
| addu | r31,r31,0×30     | ; free frame                |
| br   | 0×00000000       | ; plug with proc            |

The term "plug" in Table 5 is used to indicate that this template stub is modified with routine specific information for a particular procedure call. In the system procedure, the offset in the database is put into the stub and is available to the verification routine spy.o. The actual address of the procedure is also available to allow it to be marked in the coverage vector. The address of the check routine is also put in the stub. Finally, the stub ends with a branch to the actual procedure.

TABLE 6
Stub for a User Procedure

| subu | r31,r31,0×58 | ; make frame    |
|------|--------------|-----------------|
| st   | r1,r31,0×54  | ; save all regs |
| st.d | r2,r31,0×20  |                 |

TABLE 6-continued

| | Stub for a User Procedure | |
|---|---|---|
| st.d | r4,r31,0×28 | |
| st.d | r6,r31,0×30 | |
| st.d | r8,r31,0×38 | |
| st.d | r10,r31,0×40 | |
| st.d | r12,r31,0×48 | |
| or | r2,r0,0×000000 | ; plug with uproc sym # |
| bsr | 0×000000 | ; plug with log_uproc address |
| ld.d | r12,r31,0×48 | ; restore all regs |
| ld.d | r10,r31,0×40 | |
| ld.d | r8,r31,0×38 | |
| ld.d | r6,r31,0×30 | |
| ld.d | r4,r31,0×28 | |
| ld.d | r2,r31,0×20 | |
| ld | r1,r31,0×54 | |
| addu | r31,r31,0×58 | ; free frame |
| br | 0×000000 | ; plug with uproc address |
| word | 0×000000 | ; plug with link to previous |

For a user call of Table 6 the symbol number of the user procedure is simply used to mark the "used user procedure" bit vector and the routine ends by branching to the user procedure, as in the system procedure case. A chain of user procedure stubs are built for use by the POST program. The last word of the stub is used for this purpose.

DBV recognizes all system calls during the same pass that it recognizes procedure calls. System calls are recognized by the "tb0 0,r0,0×1c2" instruction. A system call stub is generated for each detected trap instruction. The various trap instructions are defined in *MC88100 RISC MICROPROCESSOR USER'S MANUAL, Second Edition*, supra.

A stub is also generated for sys_local calls which are recognized by a different trap vector (0×1c1) but are otherwise identical to system calls. A sample stub for system calls and sys_local calls follows in Table 7.

TABLE 7

| | Stub for a System or Sys_local Call | |
|---|---|---|
| subu | r31,r31,0×28 | ; make a stack frame |
| st | r1,r31,0×28 | ; save a register |
| bsr | 0×000000 | ; plug with verification rtn |
| br | 0×00001c | ; branch to error handling |
| ld | r1,r31,0×24 | ; good return, restore reg |
| addu | r31,r31,0×28 | ; free frame |
| br | 0×000000 | ; join user code at good return |
| ld | r1,r31,0×24 | ; restore reg |
| addu | r31,r31,0×28 | ; free frame |
| br | 0×000000 | ; join user code at bad return |

Either the system call trap checker or the sys_local trap checker can be used with the system or sys_local call stub. The system or sys_local call trap can return to either the location immediately following the trap (on an error return) or to the location following that (on an error-free return). All registers are preserved by the stub.

In the last step 86 of FIG. 14, after the application has been fully processed the total stub size is calculated by the sum of the lengths of each of the generated stubs. At this point, the instrumented application program can be assembled and outputted as indicated in the last step of FIG. 13.

Figure 15:
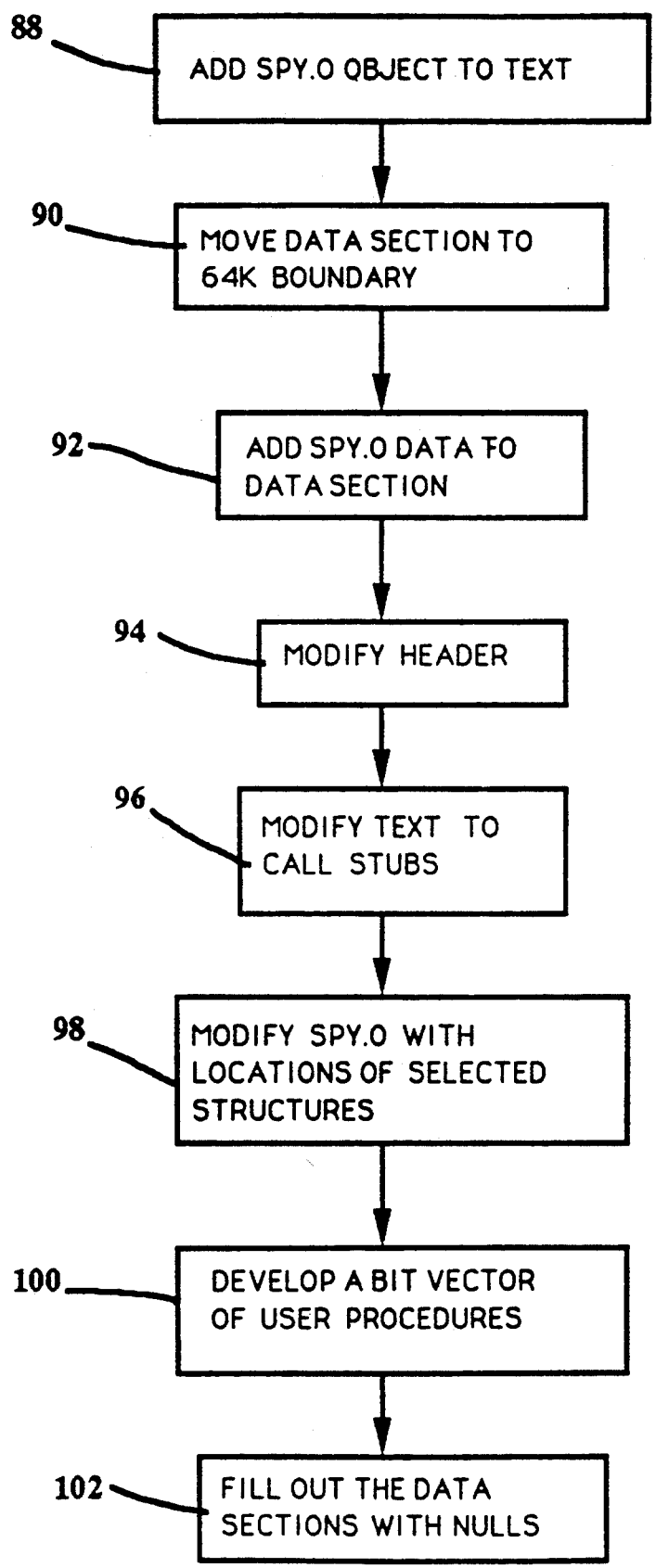
FIG. 15 is a flow diagram detailing the assemble and output step of FIG. 13.

FIG. 15 illustrates the process involved in the assembling of the instrumented application program. The description of the process of FIG. 15 will be discussed in conjunction with FIGS. 16a and 16b. The key to the insertion of the monitoring code is that there is a large gap G (generally several megabytes) in virtual addresses between the end of the text section and the start of the data section of the application program of FIG. 16a. In practice, the text section will be expanded with the monitoring code spy.o and the data section will be moved upwardly to the next 64K boundary in the memory to facilitate paging. This is complicated somewhat by spy.o's need for a small amount of data. The spy.o data is placed at the beginning of the data section as will be described in greater detail below.

Figure 16A:
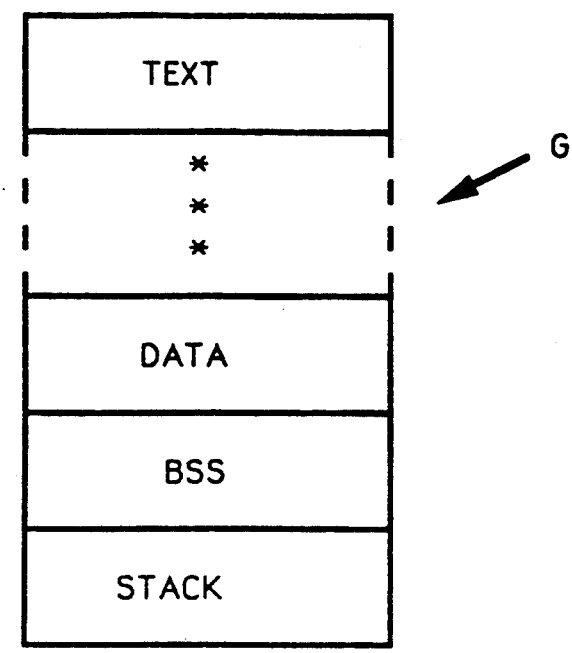
FIG. 16a illustrates the application program structure prior to dynamic instrumentation.

Therefore, the first step 88 in the process of FIG. 15 is to add the spy.o object to the text section of the application program of FIG. 16a. The text section size is incremented by the text size of the spy.o module plus the cumulative size of the stub routines. The data section is moved to the next 64K boundary in a step 90 and the spy.o data is hidden in the data segment by a step 92 by decreasing the data section start address. Appropriate changes are made to other data structures in the object file headers in a step 94 to account for the additional space. For example, the symbol table, line number table, etc. must be relocated.

Next, the text section of the input file is modified in memory in a step 96. Call instructions of the original application program are converted to call the location where the stubs are to be placed. Trap instructions are changed to branch to a system call stub. At this point, the modified text section of the input application file can be written to an output file. Certain modifications are made to the header of the spy.o code in a step 98 to tell it where to find structures that it will need later, such as the bit mask of the user procedures, etc. After this modification the spy.o module can be copied to the output file. In a step 100 a bit vector of user procedures is developed. Then the stubs are written to the output file, followed by the bit vector of the used procedures and the data section of spy.o. The data section is filled out with nulls in a step 102 and then the remainder of the input object file is copied to the output file. This final output file becomes the instrumented version of the input application program and will have the structure of FIG. 16b.

Figure 16B:
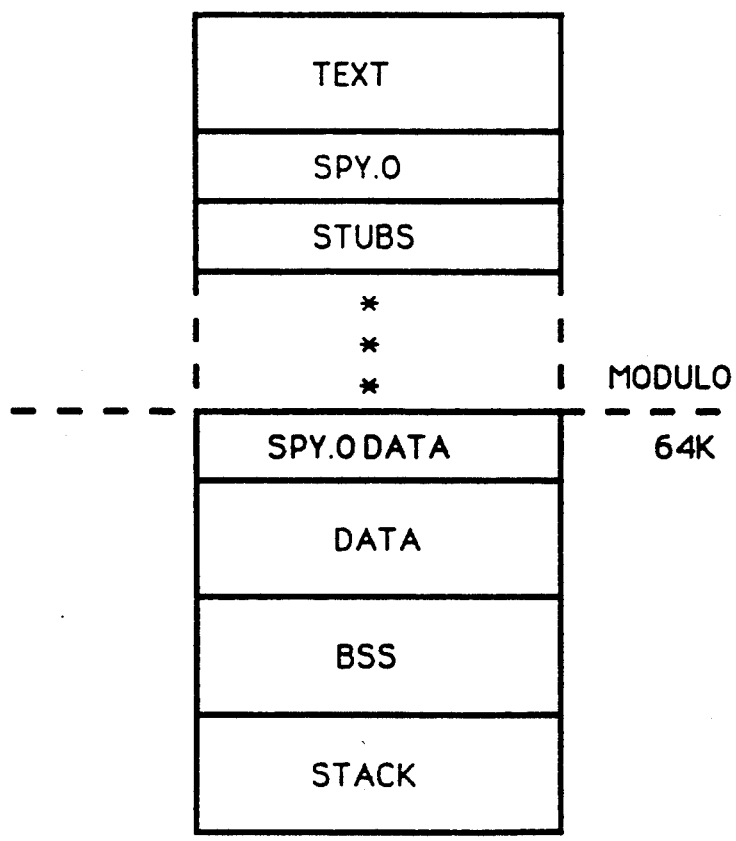
FIG. 16b illustrates the application program structure after instrumentation.

After the application program has been instrumented as in FIG. 16b it contains the instructions which test system library and system call arguments against the conformance database while the application program is running in a test harness. Both the use of non-standard defined system calls and procedures and any illegal arguments to valid system calls and procedures are detected. The testing of the application program in the test harness will be completely transparent to the user other than a small performance degradation due to the extra code being processed.

The test harness is a test program which exercises the application program. Generally, the quality analysis (QA) test program used by the application developer would be a good candidate for a test harness to use in conjunction with DBV. The test harness should be as thorough as possible by causing the application program to fully exercise all of its routines and as many as possible if the system and system library calls.

The monitoring code produces a log file with reports any dynamically detected portability problems. A program POST reads the log files and can report system call errors and system library errors. System call errors are always reported, but library call errors are not reported by default since the binary which DBV monitors is not restricted to proper library calls (only the objects which create the binary are). System library call errors may be of interest for binaries, however, since a bad system call is often the result of passing a bad argument to a library. DBV uses a shared memory segment to store statistics across fork commands so that accurate cumulative statistics can be generated.

It is important to note that DBV serves several major functions. First, DBV verifies function and system calls for dynamic conformance to the BCS rules. Secondly, DBV generates coverage statistics which indicate how thoroughly the test program has been exercised. These coverage statistics provide a "confidence factor" as to the thoroughness of the test. Furthermore, DBV has the ability to serve as a diagnostic tool since it can dynamically list all user, procedure and system calls (with their parameters) in the order that they are executed. This last mentioned ability of DBV is very useful in the debugging process of application programs.

DBV OPERATION EXAMPLES

The DBV command line is as follows:

dbv [options] infile [outfile]

It is recommended to always specify the outfile parameter because the default is to modify the infile file. Various options of DBV control the use of the previously mentioned shared memory segment, suppress coverage statistics, activate the logging of all system calls and/or procedures, etc. For example, an -a option in the options parameters will cause cumulative statistics to be generated. After the DBV program has been run, outfile is said to be an instrumented version of infile.

After running the instrumented program, the program POST is used to print out the results. The POST command is as follows:

post [options] file

The file name supplied to POST is the file which DBV has instrumented, i.e. usually outfile. The -u option causes the names of unexecuted user and system procedures to be printed.

In the following example, DBV is run on itself to produce an instrumented executable binary file named foo. The log files foo.P and foo.V are deleted before running the target program, foo, to provide a clean example. This example uses a test harness which does not exercise foo very completely: an actual test harness would have a much higher coverage factor of the basic blocks, system procedures and user procedures.

As mentioned previously, the output is viewed using the POST program. The -u option of POST prints the names of the unexecuted procedures. The -o option causes portable use of system library calls to be reported.

TABLE 8

| Sample Error Free DBV Run - Partial User Coverage | |
|---|---|
| $ dbv -a dbv foo | # instrument dbv producing foo |
| $ rm -f foo.V foo.P | # delete the log files |
| $ foo dbv bar | # run the instrumented program |
| $ post -uo foo | #print the log files |
| Start DBV validation of foo at 02/01/1990 02:19:45 GMT | |
| End DBV validation of foo at 02/01/1990 02:20:35 GMT | |
| STANDARD FEATURES USED: BCS, OCS | |
| | Calls Errors |
| Standard Library Procedures: | 29579 0 |
| System Calls: | 390 0 |
| Syslocal Calls: | 0 0 |
| Basic block coverage factor: | 11.0% |

TABLE 8-continued

| Sample Error Free DBV Run - Partial User Coverage | | | |
|---|---|---|---|
| System procedure coverage factor: | 56.3% | | |
| User procedure coverage factor: | 92.0% | | |
| Unexecuted system procedures: | | | |
| alarm | atoi | brk | ecvt |
| execlp | execv | execve | execvp |
| fcvt | fprintf | fputc | kill |
| longjmp | memchr | pause | perror |
| putc | rename | setitimer | setjmp |
| sigaction | sigaddset | sigdelset | segemptyset |
| sigfillset | sighold | signal | sigprocmask |
| sigrelse | sigsuspend | sleep | vfprintf |
| Unexecuted user procedures | | | |
| err | getpathpart | | |
| No portability violations were detected. | | | |

The "STANDARD FEATURES USED" line list the conformance options exercised by the program which, in this case, are BCS and OCS. Next are some cumulative statistics such as total number of library calls, total number of system calls and the total number of syslocal calls. These cumulative statistics can be used as an indication of how thoroughly the test harness has exercised the program. The cumulative number of detected errors is also noted.

Following this are three coverage factors representing the percentage coverage of various items during the execution of the program. The system coverage factor is the percentage of the system procedures in the program which were actually executed. The number should generally be quite high, although it may be impossible to reach 100% coverage since some of the library calls may be in other library routines or may simply be present dead code portions of the program. The user procedure coverage factor is the percentage of user procedures which are actually executed. The test harness should be designed to test 100% of the user procedures. In the example above, there were two unexecuted user routines: err and getpathpart. These two routines can be tested by running foo under another test harness as follows:

TABLE 9

| Sample Error Free DBV Run - Full User Coverage | | |
|---|---|---|
| $foo | | |
| foo: [-abceprsS2] infile [outfile] | | |
| $ post foo | | |
| Start DBV validation of foo at 02/01/1990 02:19:45 GMT | | |
| End DBV validation of foo at 02/01/1990 02:20:35 GMT | | |
| STANDARD FEATURES USED: BCS | | |
| | Calls | Errors |
| System Calls: | 390 | 0 |
| Syslocal Calls: | 0 | 0 |
| Basic block coverage factor: | 11.0% | |
| System procedure coverage factor: | 56.3% | |
| User procedure coverage factor: | 92.0% | |
| No portability violations were detected. | | |
| Start DBV validation of foo at 02/01/1990 02:44:51 GMT | | |
| End DBV validation of foo at 02/01/1990 02:44:57 GMT | | |
| STANDARD FEATURES USED: BCS | | |
| | Calls | Errors |
| System Calls: | 113 | 0 |
| Syslocal Calls: | 0 | 0 |
| No portability violations were detected. | | |
| Basic block coverage factor: | 11.9% | |
| System procedure coverage factor: | 62.0% | |
| User procedure coverage factor: | 100.0% | |

It should be noted that the output of the two runs of foo were catenated (the -a option providing cumulative statistics) and that the user procedure coverage reached 100%.

One last example will be used to illustrate how errors are handled by DBV. A test program containing several errors was created, instrumented and executed. The log files were examined by POST as follows:

TABLE 10

Sample DBV Run - Errors Detected $post bug
Start DBV validation of bug at 02/01/1990 02:51:49 GMT
*open (path = 0×401FF0, oflag = 0×100,
mode = 0×EFFFFBE0)
->> Invalid argument to open (mode = 0×EFFFFBE0)
  (Bad set: 0×EFFFFBE0, valid set: 0×FFF)
Networking used without prio sysconf(34).
*socket(af = 0×1, type = 0×0, protocol = 0×0)
->> Invalid argument to socket (type = 0×0)
  (0×0 not inlist of allowable values)
End DBV validation of bug at 02/01/1990 02:51:49 GMT As seen above, the actual erroneous call is printed along with its arguments. The names for the arguments are those defined in the OCS and BCS. Names preceded with an asterisk are system calls so that they will not be confused with library calls of the same name. The first error was caused by the following line:

fd=open("test_file", O_CREAT);

The problem with the line is that O_CREAT was selected but no mode argument was supplied. The 0×EFFFFBE0 values is simply the number contained in the register which should have contained the mode argument. The DBV test also notes that networking was used by the program without the program first checking by the call sysconf() to see if the system supports networking calls.

The final error from this test program is a complaint about an illegal argument to socket() where:

call to socket from main+0×34 is the error walkback. If multiple procedures had been present in the call chain then the entire call sequence to get to the error would have been printed.

Additional information concerning the use of SBV and DBV may be found in a document entitled 88*O-PEN CONSORTIUM, ACT/*88 *USERS GUIDE*, version 1.1, Feb. 9, 1990. Copies of the users guide may be ordered from: Director, Product Certification, 88open Software Initiative, Inc., 100 Homeland Court, Suite 800, San Jose, Calif. 95112.

It can be seen that the combination of the static analysis and the dynamic analysis of the program will provide application developers with virtual assurance that their application programs meet the binary and object standards for portability. It is therefore only necessary for application developers to test their application programs on a single conforming computer system to certify that their application programs will run on all current and future conforming systems.

While this invention has been described in terms of several preferred embodiments, it is contemplated that various alterations and permutations thereof will become apparent to those skilled in the art. It is therefore intended that the appended claims include all such alterations and permutations as fall within the true spirit and scope of the present invention.

What is claimed is:

1. A computer implemented method of verifying conformance or non-conformance of an application program to rules that define services which an operating system will provide, without requiring reference to a source code version of said application program, comprising the steps of,:
   from a first binary version of said application program, forming an instrumented binary version of said application program, by inserting monitoring code instruction routines corresponding respectively to different types of requests for service, and by processing said first binary version by locating and identifying requests for services in said first binary version and redirecting each said request for service to a corresponding one of said monitoring code instruction routines in a manner so that said monitoring code instruction routines are executed in association with corresponding ones of said requests for services which occur in the first binary version,
   executing said instrumented binary version of said application program including said monitoring code instruction routines;
   comparing calls made while said instrumented binary version of said application program is being executed, against said rules; and
   using results of said step of comparing as a basis for verifying said conformance or non-conformance.

2. The method of claim 1 further the steps of:
   storing results of said step of comparing in a log database; and
   analyzing said log database for conformance or non-conformance to said rules.

3. A computer implemented method for analyzing execution of an application program without requiring reference to a source code version of said application program, comprising the steps of:
   from a first binary version of said application program, forming an instrumented binary version of said application program, by inserting monitoring code instruction routines corresponding respectively to different types of requests for service, and by processing said first binary version by locating and identifying requests for services in said first binary version and redirecting each said request for service to a corresponding one of said monitoring code instruction routines in a manner so that said monitoring code instruction routines are executed in association with corresponding ones of said requests for services which occur in the first binary version,
   executing said instrumented binary vision program including said monitoring code instruction routines;
   deriving information from the execution of said monitoring code instruction routines; and
   analyzing the information.

4. The method of claim 1 or 3 wherein said monitoring code instruction routines monitor system calls made by said application program and generate information concerning said system calls.

5. The method of claim 1 or 3 wherein said monitoring code instruction routines monitor procedure calls made by said application program and generate information concerning said procedure calls.

6. The method of claim 1 or 3 further comprising the step of generating a list of calls and parameters in the order of call execution within said application.

7. The method of claim 3 wherein said monitoring code instruction routines monitor block usage of said application program and generate information concerning said block usage.

8. A computer implemented method of verifying conformance or non-conformance of an application program to rules that define services which an operating system will provide, without requiring reference to a source code version of said application program, comprising the steps: of storing computer data corresponding to the rules, from a first compiled executable version of said application program, forming an instrumented executable version of said application program, by inserting monitoring code instruction routines corresponding respectively to different types of requests for service, and by processing said first executable version by locating and identifying requests for services in said first executable version and redirecting each said request for service to a corresponding one of said monitoring code instruction routines in a manner so that said monitoring code instruction routines are executed in association with corresponding ones of said requests for said services which occur in said first executable version, analyzing information about occurrences, in said instrumented executable version of said application program, of requests for said services, based on execution of said monitoring code instruction routines, with reference to the rules, and providing an indication of conformance or non-conformance based on the results of the analyzing step.

9. The method of claim 8 wherein said step of storing computer data corresponding to said rules includes:

inputting said rules in a formal artificial language; and compiling said rules to create a machine-readable binary form.

10. The method of claim 8 wherein said analyzing step includes storing information received from the monitoring code instruction routines in a log; and analyzing said log for conformance or non-conformance to said rules.

11. The method of claim 8 wherein said compiled executable version comprises a binary code version or an object code version.

* * * * *

UNITED STATES PATENT AND TRADEMARK OFFICE
CERTIFICATE OF CORRECTION

PATENT NO. : 5,313,616

DATED : May 17, 1994

INVENTOR(S) : David C. Cline et al.

It is certified that error appears in the above-identified patent and that said Letters Patent is hereby corrected as shown below:

Cover page, under [56] References Cited, U.S. PATENT DOCUMENTS, please insert the following:

| | | | |
|---|---|---|---|
| 4,819,233 | 4/1989 | Delucia et al. | 371/19 |
| 4,864,569 | 9/1989 | Delucia et al. | 371/19 |
| 5,107,418 | 4/1992 | Cramer et al. | 395/700 |
| 5,142,679 | 8/1992 | Owaki et al. | 395/700 |
| 5,146,594 | 9/1992 | Iitsuka | 395/700 |

Cover page, under [56] References Cited, OTHER PUBLICATIONS, please insert the following:

Banning, "The XDOS Binary Code Conversion System", IEEE Conf., Feb-Mar 1989, pp. 282-287.

Col. 1, line 33, "an" should be --and--.

Col. 7, line 19, "oepnset1" should be --openset1--.

Col. 15, line 56, "data base" should be --database--.

Col. 22, claim 1, line 2 "of,:" should be --of:--.

Col. 22, claim 3, line 49 "vision program" should be --version--.

UNITED STATES PATENT AND TRADEMARK OFFICE
CERTIFICATE OF CORRECTION

PATENT NO. : 5,313,616
DATED : May 17, 1994
INVENTOR(S) : David C. Cline, et. al.

It is certified that error appears in the above-indentified patent and that said Letters Patent is hereby corrected as shown below:

Col. 23, claim 8, line 9 "steps: of" should be --steps of:--.

Signed and Sealed this

Seventh Day of May, 1996

Attest:

BRUCE LEHMAN

Attesting Officer     Commissioner of Patents and Trademarks